United States Patent
Chai et al.

(10) Patent No.: US 10,009,877 B2
(45) Date of Patent: Jun. 26, 2018

(54) WIRELESS SPECTRUM RESOURCE SHARING METHOD AND BASE STATION

(71) Applicant: Huawei Technologies Co., Ltd., Shenzhen, Guangdong (CN)

(72) Inventors: Li Chai, Beijing (CN); Bo Lin, Beijing (CN); Sha Ma, Beijing (CN); Juan Zheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 118 days.

(21) Appl. No.: 15/160,715

(22) Filed: May 20, 2016

(65) Prior Publication Data

US 2016/0270034 A1    Sep. 15, 2016

Related U.S. Application Data

(63) Continuation of application No. PCT/CN2013/087561, filed on Nov. 21, 2013.

(51) Int. Cl.
  *H04W 72/04* (2009.01)
  *H04W 16/10* (2009.01)
  (Continued)

(52) U.S. Cl.
  CPC ........... *H04W 72/04* (2013.01); *H04W 12/06* (2013.01); *H04W 16/04* (2013.01); *H04W 16/10* (2013.01)

(58) Field of Classification Search
  CPC ..... H04W 72/04; H04W 12/06; H04W 16/04; H04W 16/10
  See application file for complete search history.

(56) References Cited

U.S. PATENT DOCUMENTS

2008/0300890 A1* 12/2008 Dawson ................. G06Q 30/06
                                                      705/1.1
2009/0059856 A1*  3/2009 Kermoal ............... H04W 16/14
                                                      370/329
(Continued)

FOREIGN PATENT DOCUMENTS

CN    101155385 A    4/2008
CN    101433016 A    5/2009
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.5.0, Sep. 2013, 347 pages.

*Primary Examiner* — Chi H Pham
*Assistant Examiner* — Weibin Huang

(57) ABSTRACT

The present invention discloses a wireless spectrum resource invoking method and a base station device, and content thereof includes: a base station device having a wireless spectrum resource requirement capability releases wireless spectrum resource requirement information; a base station device having a wireless spectrum resource providing capability determines information about a currently transferable wireless spectrum resource according to the received wireless spectrum resource requirement information, and adds the determined transferable wireless spectrum resource to a wireless spectrum resource authorization message, to authorize the base station device having a wireless spectrum resource requirement capability to use the wireless spectrum resource; in this way, the base station device having a wireless spectrum resource requirement capability uses, according to the received wireless spectrum resource authorization message, the wireless spectrum resource that is (Continued)

transferred by the base station device having a wireless spectrum resource providing capability.

19 Claims, 4 Drawing Sheets

(51) Int. Cl.
*H04W 16/04* (2009.01)
*H04W 12/06* (2009.01)

(56) References Cited

U.S. PATENT DOCUMENTS

| 2010/0136974 | A1* | 6/2010 | Kim | H04W 16/04 |
| | | | | 455/436 |
| 2011/0125905 | A1* | 5/2011 | Baucke | H04M 15/00 |
| | | | | 709/226 |
| 2014/0120975 | A1 | 5/2014 | Liu et al. | |
| 2015/0017999 | A1* | 1/2015 | Chen | H04W 16/14 |
| | | | | 455/452.1 |

FOREIGN PATENT DOCUMENTS

| CN | 101816138 A | 8/2010 |
| CN | 101827371 A | 9/2010 |
| CN | 102811496 A | 12/2012 |
| WO | 2007/126350 A1 | 11/2007 |
| WO | 2009/071431 A1 | 6/2009 |
| WO | 2012/100565 A1 | 8/2012 |
| WO | 2012/171200 A1 | 12/2012 |
| WO | 2013/127343 A1 | 9/2013 |

* cited by examiner

WIRELESS SPECTRUM RESOURCE SHARING METHOD AND BASE STATION

CROSS-REFERENCE TO RELATED APPLICATIONS

This application is a continuation of International Application No. PCT/CN2013/087561, filed on Nov. 21, 2013, which is hereby incorporated by reference in its entirety.

TECHNICAL FIELD

The present invention relates to the field of wireless communications technologies, and in particular, to a wireless spectrum resource sharing method and a base station.

BACKGROUND

With continuous development of wireless communications technologies, wireless communications networks are currently developing toward broadband, heterogeneous, and all-IP (Internet Protocol). Demand for wireless spectrum resources increases continuously. However, as the most valuable wireless communication resources, the wireless spectrum resources are not renewable, and the contradiction between the increasing demand of users for wireless communication and the limited wireless spectrum resources increases continuously. Therefore, how to effectively use the wireless spectrum resources becomes a current focus of research on wireless communication market development of countries.

An FDM (Frequency Division Multiplexing) manner is mainly used as a conventional wireless spectrum resource allocation manner. Different frequency bands of the wireless spectrum resources are allocated to different operators, and an operator deploys a base station by using wireless spectrum resources allocated to the operator, so as to provide services for users.

However, it is found in an actual application that wireless spectrum resources allocated to operators are uneven, and quantities of services processed by each operator by using wireless spectrum resources are different. Therefore, during use, more wireless spectrum resources are allocated to some operators, and a large quantity of wireless spectrum resources are in an idle state in a service processing process, while fewer wireless spectrum resources are allocated to some operators, and wireless spectrum resources are insufficient and service processing efficiency is low in a service processing process.

In conclusion, in terms of current application of the wireless spectrum resources, a problem of low utilization of the wireless spectrum resources exists due to uneven allocation of the wireless spectrum resources.

SUMMARY

Embodiments of the present invention provide a wireless spectrum resource invoking method and a base station device, to resolve a prior-art of low utilization of wireless spectrum resources caused by uneven allocation of the wireless spectrum resources.

According to a first aspect of the present invention, a base station device is provided, including:

a transmitter, configured to release wireless spectrum resource requirement information, where the wireless spectrum resource requirement information is used to indicate a currently required wireless spectrum resource;

a receiver, configured to receive a wireless spectrum resource authorization message sent by a second device, where the wireless spectrum resource authorization message includes authorization information used to respond to the wireless spectrum resource requirement information, and the authorization information is information about a wireless spectrum resource that the second device determines, according to the wireless spectrum resource requirement information, to authorize the base station device to use; and a processor, configured to use, according to the wireless spectrum resource authorization message received by the receiver, the wireless spectrum resource that the second device authorizes the base station device to use.

With reference to the possible implementation manner of the first aspect of the present invention, in a first possible implementation manner, the wireless spectrum resource authorization message includes identifier information of the base station device, and the identifier information of the base station device is determined by the second device when the second device determines, according to the wireless spectrum resource requirement information, to authorize the base station device to use the wireless spectrum resource;

the receiver is specifically configured to receive multiple wireless spectrum resource authorization messages sent by different second devices; and the processor is specifically configured to determine, according to identifier information of a base station device included in each of the received wireless spectrum resource authorization messages, the wireless spectrum resource authorization message including identifier information of a base station device that is the same as the identifier information of the base station device, and use the authorized wireless spectrum resource that is included in the determined wireless spectrum resource authorization message.

With reference to the possible implementation manner of the first aspect of the present invention, in a second possible implementation manner, the authorization information includes at least one or more of indicator information, bandwidth information, time division duplex TDD configuration information, and load capacity information of the wireless spectrum resource;

the receiver is specifically configured to receive multiple wireless spectrum resource authorization messages sent by different second devices; and the processor is specifically configured to select, according to authorization information included in each of the received wireless spectrum resource authorization messages, the wireless spectrum resource.

With reference to the possible implementation manner of the first aspect of the present invention or the first possible implementation manner of the first aspect of the present invention or the second possible implementation manner of the first aspect of the present invention, in a third possible implementation manner, the transmitter is further configured to send a wireless spectrum resource authorization response message before the authorized wireless spectrum resource is used, where the wireless spectrum resource authorization response message is used to inform the second device sending the wireless spectrum resource authorization message that the authorized wireless spectrum resource is already accepted.

With reference to the possible implementation manner of the first aspect of the present invention or the first possible implementation manner of the first aspect of the present invention or the second possible implementation manner of the first aspect of the present invention or the third possible implementation manner of the first aspect of the present invention, in a fourth possible implementation manner, the wireless spectrum resource authorization message further includes information about duration for which the wireless spectrum resource authorized to be used; and the processor is further configured to: when using the authorized wireless spectrum resource, if determining that duration for which the authorized wireless spectrum resource is used already reaches the information that is included in the wireless spectrum resource authorization message and that is about the duration for which the wireless spectrum resource authorized to be used, stop using the authorized wireless spectrum resource.

With reference to the possible implementation manner of the first aspect of the present invention or the first possible implementation manner of the first aspect of the present invention or the second possible implementation manner of the first aspect of the present invention or the third possible implementation manner of the first aspect of the present invention, in a fifth possible implementation manner, the receiver is further configured to receive a wireless spectrum resource withdrawal message sent by the second device providing the currently used wireless spectrum resource; and the processor is further configured to stop, according to the received wireless spectrum resource withdrawal message, using the authorized wireless spectrum resource.

With reference to the possible implementation manner of the first aspect of the present invention or the first possible implementation manner of the first aspect of the present invention or the second possible implementation manner of the first aspect of the present invention or the third possible implementation manner of the first aspect of the present invention or the fourth possible implementation manner of the first aspect of the present invention or the fifth possible implementation manner of the first aspect of the present invention, in a sixth possible implementation manner, the transmitter is specifically configured to transmit the wireless spectrum resource requirement information by using a preconfigured wired interface between different devices.

With reference to the possible implementation manner of the first aspect of the present invention or the first possible implementation manner of the first aspect of the present invention or the second possible implementation manner of the first aspect of the present invention or the third possible implementation manner of the first aspect of the present invention or the fourth possible implementation manner of the first aspect of the present invention or the fifth possible implementation manner of the first aspect of the present invention, in a seventh possible implementation manner, the transmitter is specifically configured to broadcast the wireless spectrum resource requirement information on a preconfigured broadcast resource, where the preconfigured broadcast resource includes at least a preconfigured channel resource, preconfigured broadcast timeslot information, and preconfigured code domain information.

With reference to the seventh possible implementation manner of the first aspect of the present invention, in an eighth possible implementation manner, the receiver is specifically configured to check in real time whether a wireless spectrum resource authorization message sent by a second device exists on the preconfigured broadcast resource, and when determining that the wireless spectrum resource authorization message sent by the second device exists on the preconfigured broadcast resource, receive the wireless spectrum resource authorization message.

According to a second aspect of the present invention, a base station device is provided, including:

a receiver, configured to receive wireless spectrum resource requirement information released by a first device, where the wireless spectrum resource requirement information is used to indicate a currently required wireless spectrum resource;

a processor, configured to determine, according to the wireless spectrum resource requirement information, information about a wireless spectrum resource that the first device is authorized to use; and a transmitter, configured to send a wireless spectrum resource authorization message, where the wireless spectrum resource authorization message includes authorization information used to respond to the wireless spectrum resource requirement information, and the authorization information is the information that is determined by the processor and that is about the wireless spectrum resource that the first device is authorized to use.

With reference to the possible implementation manner of the second aspect of the present invention, in a first possible implementation manner, the wireless spectrum resource requirement information further includes identifier information of the first device;

the receiver is specifically configured to receive multiple pieces of wireless spectrum resource requirement information sent by different first devices;

the processor is specifically configured to determine, according to each of the received pieces of wireless spectrum resource requirement information, the first device sending the wireless spectrum resource requirement information that matches the authorized wireless spectrum resource, and determine the identifier information of the first device; and the transmitter is specifically configured to add the determined identifier information of the first device and the authorization information to the wireless spectrum resource authorization message, and send the wireless spectrum resource authorization message, where the authorization information includes at least one or more of indicator information, bandwidth information, time division duplex TDD configuration information, and load capacity information of the wireless spectrum resource.

With reference to the possible implementation manner of the second aspect of the present invention or the first possible implementation manner of the second aspect of the present invention, in a second possible implementation manner, the receiver is further configured to receive a wireless spectrum resource authorization response message sent by the first device, where the wireless spectrum resource authorization response message is used to inform the base station device sending the wireless spectrum resource authorization message that the authorized wireless spectrum resource is already accepted; and the processor is further configured to determine, according to the wireless spectrum resource authorization response message, that the wireless spectrum resource that the first device is authorized to use is already accepted by the first device, and send a usage acknowledgement message to the first device.

With reference to the possible implementation manner of the second aspect of the present invention or the first possible implementation manner of the second aspect of the present invention or the second possible implementation manner of the second aspect of the present invention, in a third possible implementation manner, the wireless spectrum resource authorization message further includes information about duration for which the wireless spectrum resource authorized to be used; and the processor is further configured to: when the information that is included in the wireless spectrum resource authorization message and that is about the duration for which the wireless spectrum resource authorized to be used is reached, withdraw the wireless spectrum resource that the first device is authorized to use.

With reference to the possible implementation manner of the second aspect of the present invention or the first possible implementation manner of the second aspect of the present invention or the second possible implementation manner of the second aspect of the present invention, in a fourth possible implementation manner, the transmitter is further configured to send a wireless spectrum resource withdrawal message, where the wireless spectrum resource withdrawal message is used to inform the first device that all or some wireless spectrum resources whose use is authorized need to be withdrawn.

With reference to the possible implementation manner of the second aspect of the present invention or the first possible implementation manner of the second aspect of the present invention or the second possible implementation manner of the second aspect of the present invention or the third possible implementation manner of the second aspect of the present invention or the fourth possible implementation manner of the second aspect of the present invention, in a fifth possible implementation manner, the receiver is further configured to: when receiving the wireless spectrum resource requirement information sent by the first device, determine a broadcast resource bearing the sent wireless spectrum resource requirement information; and the transmitter is specifically configured to send the wireless spectrum resource authorization message to the first device in the determined broadcast resource as a bearer.

According to a third aspect of the present invention, a base station device is provided, including:

a transmitter, configured to release wireless spectrum resource transfer information, where the wireless spectrum resource transfer information includes a to-be-transferred wireless spectrum resource;

a receiver, configured to receive a wireless spectrum resource sharing request message sent by a second device, where the wireless spectrum resource sharing request message is sent when the second device determines, according to the to-be-transferred wireless spectrum resource included in the received wireless spectrum resource transfer information, that the second device needs to use the wireless spectrum resource of the base station device; and a processor, configured to send a wireless spectrum resource authorization message according to the received wireless spectrum resource sharing request message, where the wireless spectrum resource authorization message includes authorization information used to respond to the wireless spectrum resource sharing request message, and the authorization information is information about the to-be-transferred wireless spectrum resource that the base station device determines, according to the received wireless spectrum resource sharing request message, to authorize the second device to use.

With reference to the possible implementation manner of the third aspect of the present invention, in a first possible implementation manner, the wireless spectrum resource sharing request message includes identifier information of the base station device, where the identifier information of the base station device is determined by the second device when the second device determines, according to the to-be-transferred wireless spectrum resource included in the received wireless spectrum resource transfer information, that the second device needs to use the to-be-transferred wireless spectrum resource;

the receiver is specifically configured to receive multiple wireless spectrum resource sharing request messages sent by different second devices; and the processor is specifically configured to determine, according to identifier information of a base station device included in each of the received wireless spectrum resource sharing request messages, the wireless spectrum resource sharing request message including identifier information of a base station device that is the same as the identifier information of the base station device, and send the wireless spectrum resource authorization message including the authorization information to the second device sending the determined wireless spectrum resource sharing request message, where the authorization information includes at least one or more of indicator information, bandwidth information, time division duplex TDD configuration information, and load capacity information of the to-be-transferred wireless spectrum resource.

With reference to the possible implementation manner of the third aspect of the present invention, in a second possible implementation manner, the wireless spectrum resource sharing request message further includes wireless spectrum resource requirement information;

the receiver is specifically configured to receive multiple wireless spectrum resource sharing request messages sent by different second devices; and the processor is specifically configured to determine, according to wireless spectrum resource requirement information included in each of the received wireless spectrum resource sharing request messages, the wireless spectrum resource requirement information including wireless spectrum resource requirement information that matches the to-be-transferred wireless spectrum resource, and send the wireless spectrum resource authorization message including the authorization information to the second device sending the determined wireless spectrum resource requirement information, where the authorization information includes at least one or more of indicator information, bandwidth information, time division duplex TDD configuration information, and load capacity information of the to-be-transferred wireless spectrum resource.

With reference to the possible implementation manner of the third aspect of the present invention or the first possible implementation manner of the third aspect of the present invention or the second possible implementation manner of the third aspect of the present invention, in a third possible implementation manner, the receiver is further configured to receive a wireless spectrum resource authorization response message sent by the second device, where the wireless spectrum resource authorization response message is used to inform the base station device sending the wireless spectrum resource authorization message that the authorized wireless spectrum resource is already accepted; and the transmitter is further configured to send a sharing permission response message to the second device according to the wireless spectrum resource authorization response message received by the receiver, where the sharing permission response message is used to respond to the wireless spectrum resource authorization response message sent by the determined second device and inform the second device that use of the authorized wireless spectrum resource is permitted.

With reference to the possible implementation manner of the third aspect of the present invention or the first possible implementation manner of the third aspect of the present invention or the second possible implementation manner of the third aspect of the present invention, in a fourth possible implementation manner, the authorization information further includes information about authorized time for using the to-be-transferred wireless spectrum resource; and the processor is further configured to: when the information that is included in the sharing permission response message and that is about the authorized time for using the to-be-transferred wireless spectrum resource is reached, withdraw the authorized wireless spectrum resource.

With reference to the possible implementation manner of the third aspect of the present invention or the first possible implementation manner of the third aspect of the present invention or the second possible implementation manner of the third aspect of the present invention, in a fifth possible implementation manner, the transmitter is further configured to: after the second device is authorized to use the to-be-transferred wireless spectrum resource, send a wireless spectrum resource withdrawal message to the second device, where the wireless spectrum resource withdrawal message is used to instruct the second device to release the authorized wireless spectrum resource.

With reference to the possible implementation manner of the third aspect of the present invention or the first possible implementation manner of the third aspect of the present invention or the second possible implementation manner of the third aspect of the present invention or the third possible implementation manner of the third aspect of the present invention or the fourth possible implementation manner of the third aspect of the present invention or the fifth possible implementation manner of the third aspect of the present invention, in a sixth possible implementation manner, the transmitter is specifically configured to broadcast the wireless spectrum resource transfer information on a preconfigured broadcast resource, where the preconfigured broadcast resource includes at least a preconfigured channel resource, preconfigured broadcast timeslot information, and preconfigured code domain information;

or transmit the wireless spectrum resource transfer information by using a preconfigured wired interface between different devices.

According to a fourth aspect of the present invention, a base station device is provided, including:

a receiver, configured to receive wireless spectrum resource transfer information released by a first device, where the wireless spectrum resource transfer information includes a to-be-transferred wireless spectrum resource;

a transmitter, configured to send a wireless spectrum resource sharing request message to the first device, where the wireless spectrum resource sharing request message is used to respond to the wireless spectrum resource transfer information, and the wireless spectrum resource sharing request message is sent when the base station device determines, according to the to-be-transferred wireless spectrum resource included in the received wireless spectrum resource transfer information, to use the wireless spectrum resource of the first device, where the receiver is further configured to receive a wireless spectrum resource authorization message sent by the first device, where the wireless spectrum resource authorization message includes authorization information used to respond to the wireless spectrum resource sharing request message, and the authorization information is information about the to-be-transferred wireless spectrum resource that the base station device determines, according to the received wireless spectrum resource sharing request message, to authorize the base station device to use; and a processor, configured to use, according to the wireless spectrum resource authorization message received by the receiver, the wireless spectrum resource that the first device authorizes the base station device to use.

With reference to the possible implementation manner of the fourth aspect of the present invention, in a first possible implementation manner, the wireless spectrum resource transfer information further includes identifier information of the first device;

the receiver is specifically configured to receive multiple pieces of wireless spectrum resource transfer information sent by different first devices;

the processor is specifically configured to determine, according to a to-be-transferred wireless spectrum resource included in each of the received pieces of wireless spectrum resource transfer information, the to-be-transferred wireless spectrum resource matching the wireless spectrum resource that currently needs to be used, and determine, according to the to-be-transferred wireless spectrum resource, the identifier information of the first device transferring the to-be-transferred wireless spectrum resource; and the transmitter is specifically configured to add the determined identifier information of the first device to the wireless spectrum resource sharing request message, and send the wireless spectrum resource sharing request message to the first device.

With reference to the possible implementation manner of the fourth aspect of the present invention or the first possible implementation manner of the fourth aspect of the present invention, in a second possible implementation manner, the authorization information includes at least one or more of indicator information, bandwidth information, time division duplex TDD configuration information, and load capacity information of the to-be-transferred wireless spectrum resource;

the receiver is further configured to receive multiple wireless spectrum resource authorization messages sent by different first devices; and the processor is further configured to choose, according to authorization information included in each of the received wireless spectrum resource authorization messages, to use the authorized wireless spectrum resource.

With reference to the second possible implementation manner of the fourth aspect of the present invention, in a third possible implementation manner, the transmitter is further configured to send a wireless spectrum resource authorization response message to the first device that authorizes use of the selected wireless spectrum resource, where the wireless spectrum resource authorization response message is used to inform the first device, which authorizes use of the selected wireless spectrum resource, that the authorized wireless spectrum resource is already accepted; and the receiver is further configured to receive a sharing permission response message sent by the first device, where the sharing permission response message is used to respond to the wireless spectrum resource authorization response message sent by the base station device and inform the base station device that use of the authorized wireless spectrum resource is permitted.

According to a fifth aspect of the present invention, a wireless spectrum resource invoking method is provided, including:

releasing, by a first device, wireless spectrum resource requirement information, where the wireless spectrum resource requirement information is used to indicate a currently required wireless spectrum resource;

receiving, by the first device, a wireless spectrum resource authorization message sent by a second device, where the wireless spectrum resource authorization message includes authorization information used to respond to the wireless spectrum resource requirement information, and the authorization information is information about a wireless spectrum resource that the second device determines, according to the wireless spectrum resource requirement information, to authorize the base station device to use; and using, by the first device according to the wireless spectrum resource authorization message received by the receiver, the wireless spectrum resource that the second device authorizes the base station device to use.

With reference to the possible implementation manner of the fifth aspect of the present invention, in a first possible implementation manner, the wireless spectrum resource authorization message includes identifier information of the first device, and the identifier information of the first device is determined by the second device when the second device determines, according to the wireless spectrum resource requirement information, to authorize the first device to use the wireless spectrum resource; and the using, by the first device according to the wireless spectrum resource authorization message received by the receiver, the wireless spectrum resource that the second device authorizes the base station device to use includes:

when receiving multiple wireless spectrum resource authorization messages sent by different second devices, determining, by the first device according to identifier information of a first device included in each of the received wireless spectrum resource authorization messages, the wireless spectrum resource authorization message including identifier information of a first device that is the same as the identifier information of the first device, and using the authorized wireless spectrum resource that is included in the determined wireless spectrum resource authorization message.

With reference to the possible implementation manner of the fifth aspect of the present invention, in a second possible implementation manner, the authorization information includes at least one or more of indicator information, bandwidth information, time division duplex TDD configuration information, and load capacity information of the wireless spectrum resource;

the using, by the first device according to the wireless spectrum resource authorization message received by the receiver, the wireless spectrum resource that the second device authorizes the base station device to use includes:

when receiving multiple wireless spectrum resource authorization messages sent by different second devices, selecting, by the first device according to authorization information included in each of the received wireless spectrum resource authorization messages, the wireless spectrum resource.

With reference to the possible implementation manner of the fifth aspect of the present invention or the first possible implementation manner of the fifth aspect of the present invention or the second possible implementation manner of the fifth aspect of the present invention, in a third possible implementation manner, before the using the authorized wireless spectrum resource, the method further includes:

sending, by the first device, a wireless spectrum resource authorization response message, where the wireless spectrum resource authorization response message is used to inform the second device sending the wireless spectrum resource authorization message that the authorized wireless spectrum resource is already accepted.

With reference to the possible implementation manner of the fifth aspect of the present invention or the first possible implementation manner of the fifth aspect of the present invention or the second possible implementation manner of the fifth aspect of the present invention or the third possible implementation manner of the fifth aspect of the present invention, in a fourth possible implementation manner, the wireless spectrum resource authorization message further includes information about duration for which the wireless spectrum resource authorized to be used; and the method further includes:

when using the authorized wireless spectrum resource, if determining that duration for which the authorized wireless spectrum resource is used already reaches the information that is included in the wireless spectrum resource authorization message and that is about the duration for which the wireless spectrum resource authorized to be used, stopping, by the first device, using the authorized wireless spectrum resource.

With reference to the possible implementation manner of the fifth aspect of the present invention or the first possible implementation manner of the fifth aspect of the present invention or the second possible implementation manner of the fifth aspect of the present invention or the third possible implementation manner of the fifth aspect of the present invention, in a fifth possible implementation manner, when the first device uses the authorized wireless spectrum resource, the method further includes:

receiving, by the first device, a wireless spectrum resource withdrawal message sent by the second device providing the currently used wireless spectrum resource, and stopping, according to the received wireless spectrum resource withdrawal message, using the authorized wireless spectrum resource.

With reference to the possible implementation manner of the fifth aspect of the present invention or the first possible implementation manner of the fifth aspect of the present invention or the second possible implementation manner of the fifth aspect of the present invention or the third possible implementation manner of the fifth aspect of the present invention or the fourth possible implementation manner of the fifth aspect of the present invention or the fifth possible implementation manner of the fifth aspect of the present invention, in a sixth possible implementation manner, the releasing, by a first device, wireless spectrum resource requirement information includes:

transmitting, by the first device, the wireless spectrum resource requirement information by using a preconfigured wired interface between different devices.

With reference to the possible implementation manner of the fifth aspect of the present invention or the first possible implementation manner of the fifth aspect of the present invention or the second possible implementation manner of the fifth aspect of the present invention or the third possible implementation manner of the fifth aspect of the present invention or the fourth possible implementation manner of the fifth aspect of the present invention or the fifth possible implementation manner of the fifth aspect of the present invention, in a seventh possible implementation manner, the releasing, by a first device, wireless spectrum resource requirement information includes:

broadcasting, by the first device, the wireless spectrum resource requirement information on a preconfigured broadcast resource, where the preconfigured broadcast resource includes at least a preconfigured channel resource, preconfigured broadcast timeslot information, and preconfigured code domain information.

With reference to the seventh possible implementation manner of the fifth aspect of the present invention, in an eighth possible implementation manner, the receiving, by the first device, a wireless spectrum resource authorization message sent by a second device includes:

checking, by the first device, in real time whether a wireless spectrum resource authorization message sent by a second device exists on the preconfigured broadcast resource, and when determining that the wireless spectrum resource authorization message sent by the second device exists on the preconfigured broadcast resource, receiving the wireless spectrum resource authorization message.

According to a sixth aspect of the present invention, a wireless spectrum resource invoking method is provided, including:

receiving, by a second device, wireless spectrum resource requirement information released by a first device, where the wireless spectrum resource requirement information is used to indicate a currently required wireless spectrum resource;

determining, by the second device according to the wireless spectrum resource requirement information, information about a wireless spectrum resource that the first device is authorized to use; and sending, by the second device, a wireless spectrum resource authorization message, where the wireless spectrum resource authorization message includes authorization information used to respond to the wireless spectrum resource requirement information, and the authorization information is the information that is determined by the processor and that is about the wireless spectrum resource that the first device is authorized to use.

With reference to the possible implementation manner of the sixth aspect of the present invention, in a first possible implementation manner, the wireless spectrum resource requirement information further includes identifier information of the first device;

the determining, by the second device according to the wireless spectrum resource requirement information, information about a wireless spectrum resource that the first device is authorized to use includes:

when receiving multiple pieces of wireless spectrum resource requirement information sent by different first devices, determining, by the second device according to each of the received pieces of wireless spectrum resource requirement information, the first device sending the wireless spectrum resource requirement information that matches the authorized wireless spectrum resource, and determining the identifier information of the first device; and the sending, by the second device, a wireless spectrum resource authorization message includes:

adding, by the second device, the determined identifier information of the first device and the authorization information to the wireless spectrum resource authorization message, and sending the wireless spectrum resource authorization message, where the authorization information includes at least one or more of indicator information, bandwidth information, time division duplex TDD configuration information, and load capacity information of the wireless spectrum resource.

With reference to the possible implementation manner of the sixth aspect of the present invention or the first possible implementation manner of the sixth aspect of the present invention, in a second possible implementation manner, after the sending, by the second device, a wireless spectrum resource authorization message, the method further includes:

receiving, by the second device, a wireless spectrum resource authorization response message sent by the first device, where the wireless spectrum resource authorization response message is used to inform the base station device sending the wireless spectrum resource authorization message that the authorized wireless spectrum resource is already accepted; and determining, by the second device according to the wireless spectrum resource authorization response message, that the wireless spectrum resource that the first device is authorized to use is already accepted by the first device, and sending a usage acknowledgement message to the first device.

With reference to the possible implementation manner of the sixth aspect of the present invention or the first possible implementation manner of the sixth aspect of the present invention or the second possible implementation manner of the sixth aspect of the present invention, in a third possible implementation manner, the wireless spectrum resource authorization message further includes information about duration for which the wireless spectrum resource authorized to be used; and after the sending, by the second device, a wireless spectrum resource authorization message, the method further includes:

when the information that is included in the wireless spectrum resource authorization message and that is about the duration for which the wireless spectrum resource authorized to be used is reached, withdrawing, by the second device, the wireless spectrum resource that the first device is authorized to use.

With reference to the possible implementation manner of the sixth aspect of the present invention or the first possible implementation manner of the sixth aspect of the present invention or the second possible implementation manner of the sixth aspect of the present invention, in a fourth possible implementation manner, after the sending, by the second device, a wireless spectrum resource authorization message, the method further includes:

sending, by the second device, a wireless spectrum resource withdrawal message, where the wireless spectrum resource withdrawal message is used to inform the first device that all or some wireless spectrum resources whose use is authorized need to be withdrawn.

With reference to the possible implementation manner of the sixth aspect of the present invention or the first possible implementation manner of the sixth aspect of the present invention or the second possible implementation manner of the sixth aspect of the present invention or the third possible implementation manner of the sixth aspect of the present invention or the fourth possible implementation manner of the sixth aspect of the present invention, in a fifth possible implementation manner, after the receiving, by a second device, wireless spectrum resource requirement information released by a first device, the method further includes:

determining, by the second device, a broadcast resource bearing the sent wireless spectrum resource requirement information; and the sending, by the second device, a wireless spectrum resource authorization message includes:

sending, by the second device, the wireless spectrum resource authorization message to the first device in the determined broadcast resource as a bearer.

According to a seventh aspect of the present invention, a wireless spectrum resource scheduling method is provided, including:

releasing, by a first device, wireless spectrum resource transfer information, where the wireless spectrum resource transfer information includes a to-be-transferred wireless spectrum resource;

receiving, by the first device, a wireless spectrum resource sharing request message sent by a second device, where the wireless spectrum resource sharing request message is sent when the second device determines, according to the to-be-transferred wireless spectrum resource included in the received wireless spectrum resource transfer information, that the second device needs to use the wireless spectrum resource of the base station device; and sending, by the first device, a wireless spectrum resource authorization message according to the received wireless spectrum resource sharing request message, where the wireless spectrum resource authorization message includes authorization information used to respond to the wireless spectrum resource sharing request message, and the authorization information is information about the to-be-transferred wireless spectrum resource that the base station device determines, according to the received wireless spectrum resource sharing request message, to authorize the second device to use.

With reference to the possible implementation manner of the seventh aspect of the present invention, in a first possible implementation manner, the wireless spectrum resource sharing request message includes identifier information of the first device, where the identifier information of the first device is determined by the second device when the second device determines, according to the to-be-transferred wireless spectrum resource included in the received wireless spectrum resource transfer information, that the second device needs to use the to-be-transferred wireless spectrum resource; and the sending, by the first device, a wireless spectrum resource authorization message according to the received wireless spectrum resource sharing request message includes:

when receiving multiple wireless spectrum resource sharing request messages sent by different second devices, determining, by the first device according to identifier information of a first device included in each of the received wireless spectrum resource sharing request messages, the wireless spectrum resource sharing request message including identifier information of a first device that is the same as the identifier information of the first device, and sending the wireless spectrum resource authorization message including the authorization information to the second device sending the determined wireless spectrum resource sharing request message, where the authorization information includes at least one or more of indicator information, bandwidth information, time division duplex TDD configuration information, and load capacity information of the to-be-transferred wireless spectrum resource.

With reference to the possible implementation manner of the seventh aspect of the present invention, in a second possible implementation manner, the wireless spectrum resource sharing request message further includes wireless spectrum resource requirement information;

the sending, by the first device, a wireless spectrum resource authorization message according to the received wireless spectrum resource sharing request message includes:

when receiving multiple wireless spectrum resource sharing request messages sent by different second devices, determining, by the first device according to wireless spectrum resource requirement information included in each of the received wireless spectrum resource sharing request messages, the wireless spectrum resource requirement information including wireless spectrum resource requirement information that matches the to-be-transferred wireless spectrum resource, and sending the wireless spectrum resource authorization message including the authorization information to the second device sending the determined wireless spectrum resource requirement information, where the authorization information includes at least one or more of indicator information, bandwidth information, time division duplex TDD configuration information, and load capacity information of the to-be-transferred wireless spectrum resource.

With reference to the possible implementation manner of the seventh aspect of the present invention or the first possible implementation manner of the seventh aspect of the present invention or the second possible implementation manner of the seventh aspect of the present invention, in a third possible implementation manner, after the sending, by the first device, a wireless spectrum resource authorization message, the method further includes:

receiving, by the first device, a wireless spectrum resource authorization response message sent by the second device, where the wireless spectrum resource authorization response message is used to inform the base station device sending the wireless spectrum resource authorization message that the authorized wireless spectrum resource is already accepted; and sending, by the first device, a sharing permission response message to the second device according to the received wireless spectrum resource authorization response message, where the sharing permission response message is used to respond to the wireless spectrum resource authorization response message sent by the determined second device and inform the second device that use of the authorized wireless spectrum resource is permitted.

With reference to the possible implementation manner of the seventh aspect of the present invention or the first possible implementation manner of the seventh aspect of the present invention or the second possible implementation manner of the seventh aspect of the present invention, in a fourth possible implementation manner, the authorization information further includes information about authorized time for using the to-be-transferred wireless spectrum resource; and after the sending, by the first device, a wireless spectrum resource authorization message, the method further includes:

when the information that is included in the sharing permission response message and that is about the authorized time for using the to-be-transferred wireless spectrum resource is reached, withdrawing, by the first device, the authorized wireless spectrum resource.

With reference to the possible implementation manner of the seventh aspect of the present invention or the first possible implementation manner of the seventh aspect of the present invention or the second possible implementation manner of the seventh aspect of the present invention, in a fifth possible implementation manner, the method further includes:

after authorizing the second device to use the to-be-transferred wireless spectrum resource, sending, by the first device, a wireless spectrum resource withdrawal message to the second device, where the wireless spectrum resource withdrawal message is used to instruct the second device to release the authorized wireless spectrum resource.

With reference to the possible implementation manner of the seventh aspect of the present invention or the first possible implementation manner of the seventh aspect of the present invention or the second possible implementation manner of the seventh aspect of the present invention or the third possible implementation manner of the seventh aspect of the present invention or the fourth possible implementation manner of the seventh aspect of the present invention or the fifth possible implementation manner of the seventh aspect of the present invention, in a sixth possible implementation manner, the releasing, by a first device, wireless spectrum resource transfer information includes:

broadcasting, by the first device, the wireless spectrum resource transfer information on a preconfigured broadcast resource, where the preconfigured broadcast resource includes at least a preconfigured channel resource, preconfigured broadcast timeslot information, and preconfigured code domain information;

or transmitting, by the first device, the wireless spectrum resource transfer information by using a preconfigured wired interface between different devices.

According to an eighth aspect of the present invention, a wireless spectrum resource invoking method is provided, including:

receiving, by a second device, wireless spectrum resource transfer information released by a first device, where the wireless spectrum resource transfer information includes a to-be-transferred wireless spectrum resource;

sending, by the second device, a wireless spectrum resource sharing request message to the first device, where the wireless spectrum resource sharing request message is used to respond to the wireless spectrum resource transfer information, and the wireless spectrum resource sharing request message is sent when the second device determines, according to the to-be-transferred wireless spectrum resource included in the received wireless spectrum resource transfer information, to use the wireless spectrum resource of the first device;

receiving, by the second device, a wireless spectrum resource authorization message sent by the first device, where the wireless spectrum resource authorization message includes authorization information used to respond to the wireless spectrum resource sharing request message, and the authorization information is information about the to-be-transferred wireless spectrum resource that the base station device determines, according to the received wireless spectrum resource sharing request message, to authorize the base station device to use; and using, by the second device according to the received wireless spectrum resource authorization message, the wireless spectrum resource that the first device authorizes the base station device to use.

With reference to the possible implementation manner of the eighth aspect of the present invention, in a first possible implementation manner, the wireless spectrum resource transfer information further includes identifier information of the first device;

the sending, by the second device, a wireless spectrum resource sharing request message to the first device includes:

when receiving multiple pieces of wireless spectrum resource transfer information sent by different first devices, determining, by the second device according to a to-be-transferred wireless spectrum resource included in each of the received pieces of wireless spectrum resource transfer information, the to-be-transferred wireless spectrum resource matching the wireless spectrum resource that currently needs to be used; determining, according to the to-be-transferred wireless spectrum resource, the identifier information of the first device transferring the to-be-transferred wireless spectrum resource; and adding the determined identifier information of the first device to the wireless spectrum resource sharing request message, and sending the wireless spectrum resource sharing request message to the first device.

With reference to the possible implementation manner of the eighth aspect of the present invention or the first possible implementation manner of the eighth aspect of the present invention, in a second possible implementation manner, the authorization information includes at least one or more of indicator information, bandwidth information, time division duplex TDD configuration information, and load capacity information of the to-be-transferred wireless spectrum resource;

the using, by the second device according to the received wireless spectrum resource authorization message, the wireless spectrum resource that the first device authorizes the base station device to use includes:

when receiving multiple wireless spectrum resource authorization messages sent by different first devices, choosing, by the second device according to authorization information included in each of the received wireless spectrum resource authorization messages, to use the authorized wireless spectrum resource.

With reference to the second possible implementation manner of the eighth aspect of the present invention, in a third possible implementation manner, after the receiving, by the second device, a wireless spectrum resource authorization message, before the using the wireless spectrum resource that the first device authorizes the base station device to use, the method further includes:

sending, by the second device, a wireless spectrum resource authorization response message to the first device that authorizes use of the selected wireless spectrum resource, where the wireless spectrum resource authorization response message is used to inform the first device, which authorizes use of the selected wireless spectrum resource, that the authorized wireless spectrum resource is already accepted; and receiving a sharing permission response message sent by the first device, where the sharing permission response message is used to respond to the wireless spectrum resource authorization response message sent by the base station device and inform the second device that use of the authorized wireless spectrum resource is permitted.

Beneficial effects of the present invention are as follows:

In the embodiments of the present invention, a base station device having a wireless spectrum resource requirement capability releases wireless spectrum resource requirement information; a base station device having a wireless spectrum resource providing capability determines information about a currently transferable wireless spectrum resource according to the received wireless spectrum resource requirement information, and adds the determined transferable wireless spectrum resource to a wireless spectrum resource authorization message, to authorize the base station device having a wireless spectrum resource requirement capability to use the wireless spectrum resource; in this way, the base station device having a wireless spectrum resource requirement capability uses, according to the received wireless spectrum resource authorization message, the wireless spectrum resource that is transferred by the base station device having a wireless spectrum resource providing capability. Different base station devices transfer wireless spectrum resources to each other, to flexibly and adaptively coordinate use of wireless spectrum resources according to actual requirements of different base station devices, thereby improving utilization of wireless spectrum resources.

DETAILED DESCRIPTION

Figure 1:
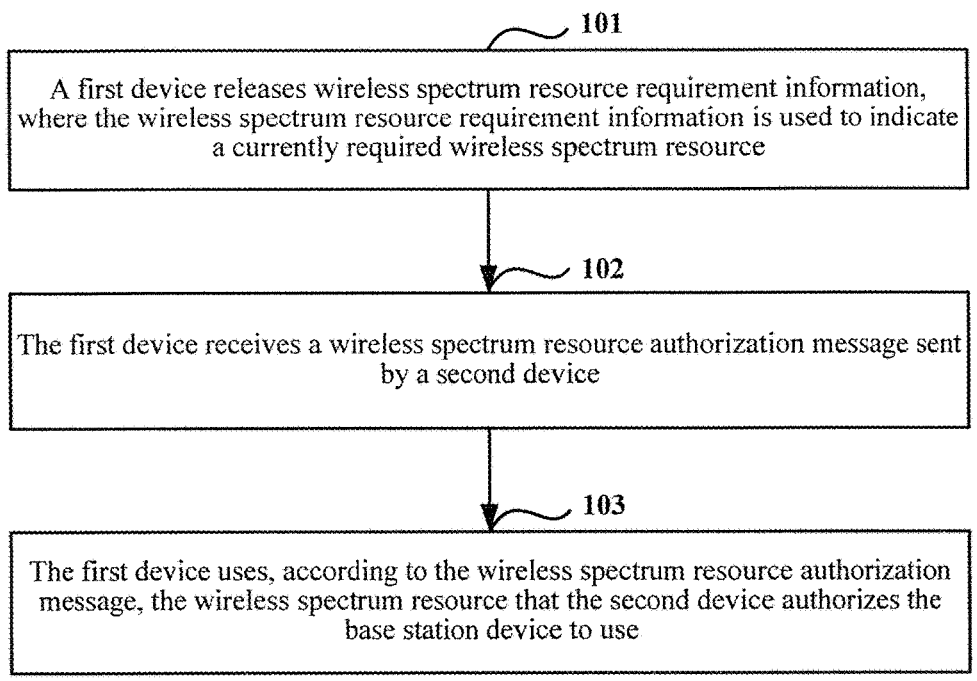
FIG. 1 is a flowchart of a wireless spectrum resource scheduling method according to Embodiment 1 of the present invention.

To achieve the objective of the present invention, embodiments of the present invention provide a wireless spectrum resource invoking method and a base station device. A base station device having a wireless spectrum resource requirement capability releases wireless spectrum resource requirement information; a base station device having a wireless spectrum resource providing capability determines information about a currently transferable wireless spectrum resource according to the received wireless spectrum resource requirement information, and adds the determined transferable wireless spectrum resource to a wireless spectrum resource authorization message, to authorize the base station device having a wireless spectrum resource requirement capability to use the wireless spectrum resource; in this way, the base station device having a wireless spectrum resource requirement capability uses, according to the received wireless spectrum resource authorization message, the wireless spectrum resource that is transferred by the base station device having a wireless spectrum resource providing capability. Different base station devices transfer wireless spectrum resources to each other, to flexibly and adaptively coordinate use of wireless spectrum resources according to actual requirements of different base station devices, thereby improving utilization of wireless spectrum resources.

It should be noted that, it is found through research that when a conventional wireless spectrum resource allocation manner is used, after each operator obtains a wireless spectrum resource allocated to the operator, each operator can only independently use an exclusive wireless spectrum resource allocated to the operator; or when a device of an operator does not use exclusive wireless spectrum resources, another operator can use, in the case of low power, the wireless spectrum resources that are exclusive to the operator and not exclusive to the another operator. Meanwhile, when a frequency band of a wireless spectrum resource allocated to an operator A is adjacent to a frequency band of a wireless spectrum resource allocated to an operator B, to avoid interference between the wireless spectrum resources of the adjacent frequency bands, when the operator A and the operator B respectively use the wireless spectrum resources allocated to the operator A and the operator B, the operator A and the operator B respectively add a guard band (for example, a wireless spectrum resource of another frequency band) to the wireless spectrum resources of the operator A and the operator B, causing a waste of wireless spectrum resources and relatively low utilization of wireless spectrum resources.

Therefore, the embodiments of the present invention not only can be applied to base station devices that are deployed by a same operator and work at different frequency bands, to improve utilization of wireless spectrum resources, but also can be applied to base station devices that are deployed by different operators, so as to avoid a waste of wireless spectrum resources and effectively improve utilization of wireless spectrum resources. A specific application scenario of the embodiments of the present invention is not specifically limited herein.

The technical solutions provided in embodiments of the present invention may be applied to various wireless communications networks, such as a Global System for Mobile Communications (global system for mobile communication, GSM for short) system, a Code Division Multiple Access (CDMA) system, a Wideband Code Division Multiple Access (WCDMA) system, a Universal Mobile Telecommunications System (UMTS), a general packet radio service (GPRS) system, a Long Term Evolution (LTE) system, Long Term Evolution Advanced (LTE-A) system, and a Worldwide Interoperability for Microwave Access (WiMAX) system. The terms "network" and "system" can be interchanged with each other.

In the embodiments of the present invention, a base station (BS) or a base station device may be a device in communication with user equipment (UE) or another communications station such as a relay station, and may provide communication coverage in a specific physical area. For example, the base station may be specifically a base transceiver station (BTS) or a base station controller (BSC) in GSM or CDMA; or may be a node B (Node B, NB for short) in UMTS or a radio network controller (RNC) in UMTS; or may be further an evolved NodeB (evolutional node B, ENB or eNodeB for short) in LTE; or may be another access network device providing an access service in a wireless communications network, which is not limited in the present invention.

The embodiments of the present invention are described below in detail with reference to this specification and the accompanying drawings.

Embodiment 1

As shown in FIG. 1, which is a flowchart of a wireless spectrum resource scheduling method according to Embodiment 1 of the present invention, the method may be as follows:

Step 101: A first device releases wireless spectrum resource requirement information, where the wireless spectrum resource requirement information is used to indicate a currently required wireless spectrum resource.

In step 101, the first device is a requester of a wireless spectrum resource, that is, when using allocated exclusive wireless spectrum resources, the first device finds that the exclusive wireless spectrum resources are in shortage and an extra wireless spectrum resource needs to be added.

In this case, the first device to release the wireless spectrum resource requirement information in the following manners, but are not limited to the following manners:

A first manner: The first device broadcasts the wireless spectrum resource requirement information on a preconfigured broadcast resource, where the preconfigured broadcast resource includes at least a preconfigured channel resource, preconfigured broadcast timeslot information, and preconfigured code domain information.

For example, the preconfigured channel resource is a channel resource A or a channel resource B, that is, the wireless spectrum resource requirement information released by the first device is transmitted by using the channel resource A or the channel resource B;

the preconfigured broadcast timeslot information is timeslot information C or timeslot information D or the like; and the preconfigured code domain information is OPD-RNTI A/B or the like.

A second manner: The first device transmits the wireless spectrum resource requirement information by using a preconfigured wired interface between different devices.

It should be noted that because the wireless spectrum resource requirement information is used to indicate a currently required wireless spectrum resource, the wireless spectrum resource requirement information further includes information about wireless spectrum resources required by the first device, where the information about the wireless spectrum resources includes but is not limited to: a quantity of the required wireless spectrum resources, information about a quantity of terminal devices that need to be served, information about a distribution of service types of the terminal devices that need to be served, and the like.

It should be noted that the first device may release the wireless spectrum resource requirement information by sending a wireless spectrum resource requirement message, which is not limited herein.

Step 102: The first device receives a wireless spectrum resource authorization message sent by a second device.

The wireless spectrum resource authorization message includes authorization information used to respond to the wireless spectrum resource requirement information, and the authorization information is information about a wireless spectrum resource that the second device determines, according to the wireless spectrum resource requirement information, to authorize the base station device to use.

In step 102, after releasing the wireless spectrum resource requirement information, the first device checks in real time whether a wireless spectrum resource authorization message sent by a second device exists on the preconfigured broadcast resource, and when determining that the wireless spectrum resource authorization message sent by the second device exists on the preconfigured broadcast resource, receives the wireless spectrum resource authorization message.

In another embodiment of the present invention, when receiving multiple wireless spectrum resource authorization messages sent by different second devices, the first device determines a broadcast resource bearing each of the sent wireless spectrum resource authorization messages, and obtains, according to the determined broadcast resources, a wireless spectrum resource authorization message borne on a broadcast resource that is the same as a broadcast resource used by the first device to release the wireless spectrum resource requirement information, and in this case, the obtained wireless spectrum resource authorization message is determined as a wireless spectrum resource authorization message specified to be sent to the first device.

In this way, the first device can determine in time a wireless spectrum resource authorization message sent to the first device, which increases a wireless spectrum resource invoking speed and further improves utilization of wireless spectrum resources.

It should be noted that the first device may receive a wireless spectrum resource authorization message from one second device, or may receive wireless spectrum resource authorization messages from multiple second devices, which is not limited herein.

In another embodiment of the present invention, the wireless spectrum resource authorization message includes identifier information of the first device.

The identifier information of the first device is determined by the second device when the second device determines, according to the wireless spectrum resource requirement information, to authorize the first device to use the wireless spectrum resource.

When receiving multiple wireless spectrum resource authorization messages sent by different second devices, the first device determines, according to identifier information of a first device included in each of the received wireless spectrum resource authorization messages, that a wireless spectrum resource authorization message including identifier information of a first device that is the same as the identifier information of the first device is a wireless spectrum resource authorization message specified to be sent to the first device.

It should be noted that a wireless spectrum resource authorization message specified to be sent to the first device is sent exclusively to the first device by a second device sending the wireless spectrum resource authorization message, and the second device intends the first device to use a wireless spectrum resource authorized by the second device.

For example, when receiving wireless spectrum resource requirement information sent by a base station device A requirement a wireless spectrum resource, a base station device B providing the wireless spectrum resource sends a wireless spectrum resource authorization message to the base station device A, where the wireless spectrum resource authorization message carries identifier information of the base station device A. Therefore, it means that the wireless spectrum resource authorization message sent by the base station device B is a wireless spectrum resource authorization message specified to be sent to the base station device A, and the wireless spectrum resource provided by the base station device B is intended for use by the base station device A.

In another embodiment of the present invention, when receiving multiple wireless spectrum resource authorization messages sent by different second devices, the first device selects, according to authorization information included in each of the received wireless spectrum resource authorization messages, the wireless spectrum resource.

The authorization information includes at least one or more of indicator information, bandwidth information, time division duplex TDD configuration information, and load capacity information of the wireless spectrum resource.

Besides, the authorization information may further include: carrier information of the wireless spectrum resource, such as bandwidth information, SFN (System Frame Number, system frame number) information, or time division duplex TDD configuration information of the wireless spectrum resource, carrier status information of the wireless spectrum resource, such as service load information or interference information (which is, for example, indicated in a form of a percentage or a bitmap, where an indication granularity may be sub-bandwidth, PRB (Physical Resource Block, system resource block), or PRB group mode), information about a quantity of terminals served by the wireless spectrum resource, information about a distribution of service types of the terminals served by the wireless spectrum resource, information about an authorized period within which the wireless spectrum resource can be used, information about an authorized sharing mode of the wireless spectrum resource (for example, a full bandwidth sharing mode, a sub-bandwidth sharing mode, or a PRB or PRB group mode), TDM (Time Division Multiplexing, time division multiplexing) pattern information, information about a space division usage manner, information about a usage price, and the like.

Step 103: The first device uses, according to the wireless spectrum resource authorization message, the wireless spectrum resource that the second device authorizes the base station device to use.

In step 103, the using, by the first device according to the wireless spectrum resource authorization message, the wireless spectrum resource that the second device authorizes the base station device to use specifically includes:

when receiving multiple wireless spectrum resource authorization messages sent by different second devices, determining, by the first device according to identifier information of a first device included in each of the received wireless spectrum resource authorization messages, the wireless spectrum resource authorization message including identifier information of a first device that is the same as the identifier information of the first device, and using the authorized wireless spectrum resource that is included in the determined wireless spectrum resource authorization message; or when receiving multiple wireless spectrum resource authorization messages sent by different second devices, choosing, by the first device according to authorization information included in each of the received wireless spectrum resource authorization messages, to use the wireless spectrum resource.

In another embodiment of the present invention, before the using the authorized wireless spectrum resource, the method further includes:

sending, by the first device, a wireless spectrum resource authorization response message, where the wireless spectrum resource authorization response message is used to inform the second device sending the wireless spectrum resource authorization message that the authorized wireless spectrum resource is already accepted; and receiving, by the first device, a usage acknowledgement message sent by the second device.

It should be noted that the usage acknowledgement message is sent by an authorizer (that is, the second device) of the wireless spectrum resource by the first device.

The usage acknowledgement message includes at least one or more of indicator information, bandwidth information, time division duplex TDD configuration information, load capacity information, interference information, a quantity of served UEs, a distribution of service types of the served UEs, sharing duration, a sharing mode, and sharing price information of the wireless spectrum resource.

The first device uses the authorized wireless spectrum resource according to the received wireless spectrum resource authorization message or usage acknowledgement message, thereby implementing scheduled use of the wireless spectrum resource between the first device and the second device.

In another embodiment of the present invention, in a process of implementing scheduled use of the wireless spectrum resource between the first device and the second device, a wireless spectrum resource status report may be initiated between the first device and the second device, where the wireless spectrum resource report is used to inform a peer end of a usage status of a wireless spectrum resource of a local end.

It should be noted that a manner for sending the wireless spectrum resource status report may be determined by using a request mechanism, or the wireless spectrum resource may be sent in a periodical manner, which is not limited herein.

In another embodiment of the present invention, after the first device implements scheduled use of the wireless spectrum resource with the second device, the first device releases the authorized wireless spectrum resource by the second device.

The first device to release the authorized wireless spectrum resource in the following manners, but are not limited to the following manners:

A first manner:

The wireless spectrum resource authorization message further includes information about duration for which the wireless spectrum resource authorized to be used;

when using the authorized wireless spectrum resource, if determining that duration for which the authorized wireless spectrum resource is used already reaches the information that is included in the wireless spectrum resource authorization message and that is about the duration for which the wireless spectrum resource authorized to be used, the first device stops using the authorized wireless spectrum resource; and after stopping using the shared wireless spectrum resource, the first device releases the wireless spectrum resource.

A second manner:

When using the authorized wireless spectrum resource, the first device receives a wireless spectrum resource withdrawal message sent by the second device providing the currently used wireless spectrum resource, and stops, according to the received wireless spectrum resource withdrawal message, using the authorized wireless spectrum resource.

An implementation manner used by the first device to stop, according to the received wireless spectrum resource withdrawal message, using the authorized wireless spectrum resource includes but is not limited to:

the first device stops, according to information about an end time point carried in the received wireless spectrum resource withdrawal message, using the shared wireless spectrum resource when the information about the time point is satisfied or before the time point;

or the first device stops, according to information about an end timer carried in the received wireless spectrum resource withdrawal message, using the shared wireless spectrum resource when the timer times out.

In another embodiment of the present invention, after the receiving, by the first device, a wireless spectrum resource withdrawal message sent by the second device providing the currently used wireless spectrum resource, the method further includes:

sending, by the first device, a withdrawal response message to the second device providing the currently used wireless spectrum resource.

Specifically, for a service that is being executed by using the authorized wireless spectrum resource and that has not been finished yet, the first device stops, according to the received wireless spectrum resource withdrawal message, using the authorized wireless spectrum resource and uses a currently sharable wireless spectrum resource of the first device instead to execute the service, and sends a withdrawal response message to the second device providing the currently used wireless spectrum resource.

When sending the withdrawal response message to the second device providing the currently used wireless spectrum resource, the first device releases the currently used spectrum resource, and releases new wireless spectrum resource requirement information.

According to the solution in Embodiment 1 of the present invention, a base station device having a wireless spectrum resource requirement capability releases wireless spectrum resource requirement information; a base station device having a wireless spectrum resource providing capability determines information about a currently transferable wireless spectrum resource according to the received wireless spectrum resource requirement information, and adds the determined transferable wireless spectrum resource to a wireless spectrum resource authorization message, to authorize the base station device having a wireless spectrum resource requirement capability to use the wireless spectrum resource; in this way, the base station device having a wireless spectrum resource requirement capability uses, according to the received wireless spectrum resource authorization message, the wireless spectrum resource that is transferred by the base station device having a wireless spectrum resource providing capability. Different base station devices transfer wireless spectrum resources to each other, to flexibly and adaptively coordinate use of wireless spectrum resources according to actual requirements of different base station devices, thereby improving utilization of wireless spectrum resources.

Embodiment 2

Embodiment 2 of the present invention provides a wireless spectrum resource scheduling method. Embodiment 2 of the present invention is an invention that belongs to a same inventive concept as that of Embodiment 1 of the present invention, and describes the solution in Embodiment 1 of the present invention in detail from the perspective of a second device. The method may be as follows:

The first step: A second device receives wireless spectrum resource requirement information released by a first device, where the wireless spectrum resource requirement information is used to indicate a currently required wireless spectrum resource.

When the first device broadcasts the wireless spectrum resource requirement information on a preconfigured broadcast resource, the second device receives, by using the preconfigured broadcast resource, the wireless spectrum resource requirement information sent by the first device.

When the first device transmits the wireless spectrum resource requirement information by using a preconfigured wired interface between different devices, the second device receives, by using the wired interface, the wireless spectrum resource requirement information sent by the first device.

The second device periodically receives the wireless spectrum resource requirement information broadcast by the first device.

Optionally, after the receiving, by a second device, wireless spectrum resource requirement information sent by a first device, the method further includes:

determining, by the second device, a broadcast resource bearing the sent wireless spectrum resource requirement information.

For example, a base station device 1 providing a wireless spectrum resource acquires, on a preconfigured broadcast resource according to a set time period or when determining that a preset wireless spectrum resource requirement information receiving event occurs, wireless spectrum resource requirement information released by another device, and when acquiring wireless spectrum resource requirement information released by another device, determines a broadcast resource bearing the sent wireless spectrum resource requirement information.

Optionally, the wireless spectrum resource requirement information further includes identifier information of the first device.

The second step: The second device determines, according to the wireless spectrum resource requirement information, information about a wireless spectrum resource that the first device is authorized to use.

Because the second device is a provider of the wireless spectrum resource and has a wireless spectrum resource providing capability, when using allocated wireless spectrum resources, the second device finds that a large quantity of wireless spectrum resources are idle, and can transfer a wireless spectrum resource that is allocated to the second device and that is idle and not used for the moment.

The determining, by the second device according to the wireless spectrum resource requirement information, information about a wireless spectrum resource that the first device is authorized to use specifically includes:

when receiving multiple pieces of wireless spectrum resource requirement information sent by different first devices, determining, by the second device according to each of the received pieces of wireless spectrum resource requirement information, the first device sending the wireless spectrum resource requirement information that matches the authorized wireless spectrum resource, and determining the identifier information of the first device.

For example, after receiving wireless spectrum resource requirement information broadcast by a first device c and wireless spectrum resource requirement information broadcast by a first device d, a second device a determines, according to requirement information carried in the wireless spectrum resource requirement information broadcast by the first device c, a quantity of wireless spectrum resources required by the first device c (or a quantity of served terminal devices or service distribution information of the served terminal devices), and determines whether the quantity of wireless spectrum resources matches information about wireless spectrum resources that can be currently authorized by the second device a (that is, whether a requirement of the first device c can be satisfied); and if a determining result is yes, the second device a determines identifier information of the first device c, and establishes a correspondence between the determined wireless spectrum resources that can be authorized and the identifier information of the first device c; or if a determining result is no, the second device a continues to perform determining for the first device d in the same manner.

The third step: The second device sends a wireless spectrum resource authorization message.

The wireless spectrum resource authorization message includes authorization information used to respond to the wireless spectrum resource requirement information, and the authorization information is the information that is determined by the processor and that is about the wireless spectrum resource that the first device is authorized to use.

After receiving the wireless spectrum resource requirement information sent by the first device, the second device determines a broadcast resource bearing the sent wireless spectrum resource requirement information, and in this case, the second device sends the wireless spectrum resource authorization message in the determined broadcast resource as a bearer.

Still using the foregoing "for example" as an example, the second device determines, according to the wireless spectrum resource requirement information, a wireless spectrum resource that the second device authorizes the first device c to use, and requirements to send a wireless spectrum resource authorization message to the first device c. In this case, the second device sends the wireless spectrum resource authorization message by using a broadcast resource that is used by the first device c to broadcast the wireless spectrum resource requirement information. In this way, the first device c can receive the wireless spectrum resource authorization message of the second device in a targeted manner, which makes scheduled use of the wireless spectrum resource more targeted and effective and effectively improves utilization of wireless spectrum resources.

Optionally, when receiving multiple pieces of wireless spectrum resource requirement information sent by different first devices, the second device determines, according to each of the received pieces of wireless spectrum resource requirement information, the first device sending the wireless spectrum resource requirement information that matches the authorized wireless spectrum resource, and determines the identifier information of the first device; and adds the determined identifier information of the first device and the authorization information to the wireless spectrum resource authorization message, and sends the wireless spectrum resource authorization message, where the authorization information includes at least one or more of indicator information, bandwidth information, time division duplex TDD configuration information, and load capacity information of the wireless spectrum resource.

The fourth step: The second device receives a wireless spectrum resource authorization response message sent by the first device.

The wireless spectrum resource authorization response message is used to inform the base station device sending the wireless spectrum resource authorization message that the authorized wireless spectrum resource is already accepted.

Specifically, when receiving multiple wireless spectrum resource authorization response messages sent by different first devices, the second device determines, according to identifier information of a second device carried in each of the wireless spectrum resource authorization response messages or a wireless spectrum resource whose use is authorized and that is carried in each of the wireless spectrum resource authorization response messages, whether the authorized wireless spectrum resource is accepted by the first device; and if a determining result is yes, the second device performs the fifth step; otherwise, the second device continues to search for another device releasing wireless spectrum resource requirement information, or actively releases wireless spectrum resource transfer information.

When receiving multiple wireless spectrum resource authorization response messages sent by different first devices, the second device determines, according to identifier information of a second device carried in each of the wireless spectrum resource authorization response messages, whether the carried identifier information of the second device is the same as the identifier information of the second device; and if a determining result is yes, the second device determines that the authorized wireless spectrum resource is accepted by the first device; or if a determining result is no, the second device determines that the authorized wireless spectrum resource is not accepted by the first device.

Alternatively, when receiving multiple wireless spectrum resource authorization response messages sent by different first devices, the second device determines, according to a wireless spectrum resource whose use is authorized and that is carried in each of the wireless spectrum resource authorization response messages, whether the authorized wireless spectrum resource is the same as the authorized wireless spectrum resource by the second device; and if a determining result is yes, the second device determines that the authorized wireless spectrum resource is accepted by the first device; or if a determining result is no, the second device determines that the authorized wireless spectrum resource is not accepted by the first device.

The fifth step: The second device determines, according to the wireless spectrum resource authorization response message, that the wireless spectrum resource that the first device is authorized to use is already accepted by the first device, and sends a usage acknowledgement message to the first device.

The usage acknowledgement message includes at least one or more of indicator information, bandwidth information, time division duplex TDD configuration information, load capacity information, interference information, a quantity of served UEs, a distribution of service types of the served UEs, sharing duration, a sharing mode, and sharing price information of the wireless spectrum resource.

Besides, the usage acknowledgement message further includes carrier information of the wireless spectrum resource (that is, bandwidth information, SFN (System Frame Number, system frame number) information, time division duplex TDD configuration information, or the like of the wireless spectrum resource), carrier status information of the wireless spectrum resource (that is, service load information, interference information (which is, for example, indicated in a form of a percentage or a bitmap, where an indication granularity may be sub-bandwidth, PRB (Physical Resource Block, system resource block), or PRB group mode), information about a quantity of terminals that can be served, information about a distribution of service types of the served terminals, information about an authorized period within which the wireless spectrum resource can be used, information about an authorized sharing mode of the wireless spectrum resource (for example, a full bandwidth sharing mode, a sub-bandwidth sharing mode, or a PRB or PRB group mode), TDM (Time Division Multiplexing, time division multiplexing) pattern information, information about a space division usage manner, information about a usage price, and the like.

The sixth step: After sending the wireless spectrum resource authorization message, the second device withdraws, according to a requirement for the authorized wireless spectrum resource, the wireless spectrum resource that the first device is authorized to use.

The second device to withdraw the wireless spectrum resource that the first device is authorized to use in the following manners, but are not limited to the following manners:

A first manner: The wireless spectrum resource authorization message further includes information about duration for which the wireless spectrum resource authorized to be used; and when the information that is included in the wireless spectrum resource authorization message and that is about the duration for which the wireless spectrum resource authorized to be used is reached, the second device withdraws the wireless spectrum resource that the first device is authorized to use.

A second manner:

The second device sends a wireless spectrum resource withdrawal message, where the wireless spectrum resource withdrawal message is used to inform the first device that all or some wireless spectrum resources whose use is authorized need to be withdrawn.

It should be noted that the second device may send the wireless spectrum resource withdrawal message to the first device when a service quantity increases or a UE quantity increases or in another case that causes an increased quantity of required wireless spectrum resources or in other cases, which is not limited herein.

Specifically, when determining that the second device requirements more wireless spectrum resources, the second device sends the wireless spectrum resource withdrawal message to the first device.

The wireless spectrum resource withdrawal message further carries a quantity of some withdrawn wireless spectrum resources or frequency band information of all withdrawn wireless spectrum resources or withdrawal wait time information or the like.

Optionally, the second device receives a withdrawal response message sent by the first device, and sends a withdrawal acknowledgement message to the first device.

Embodiment 3

Figure 2:
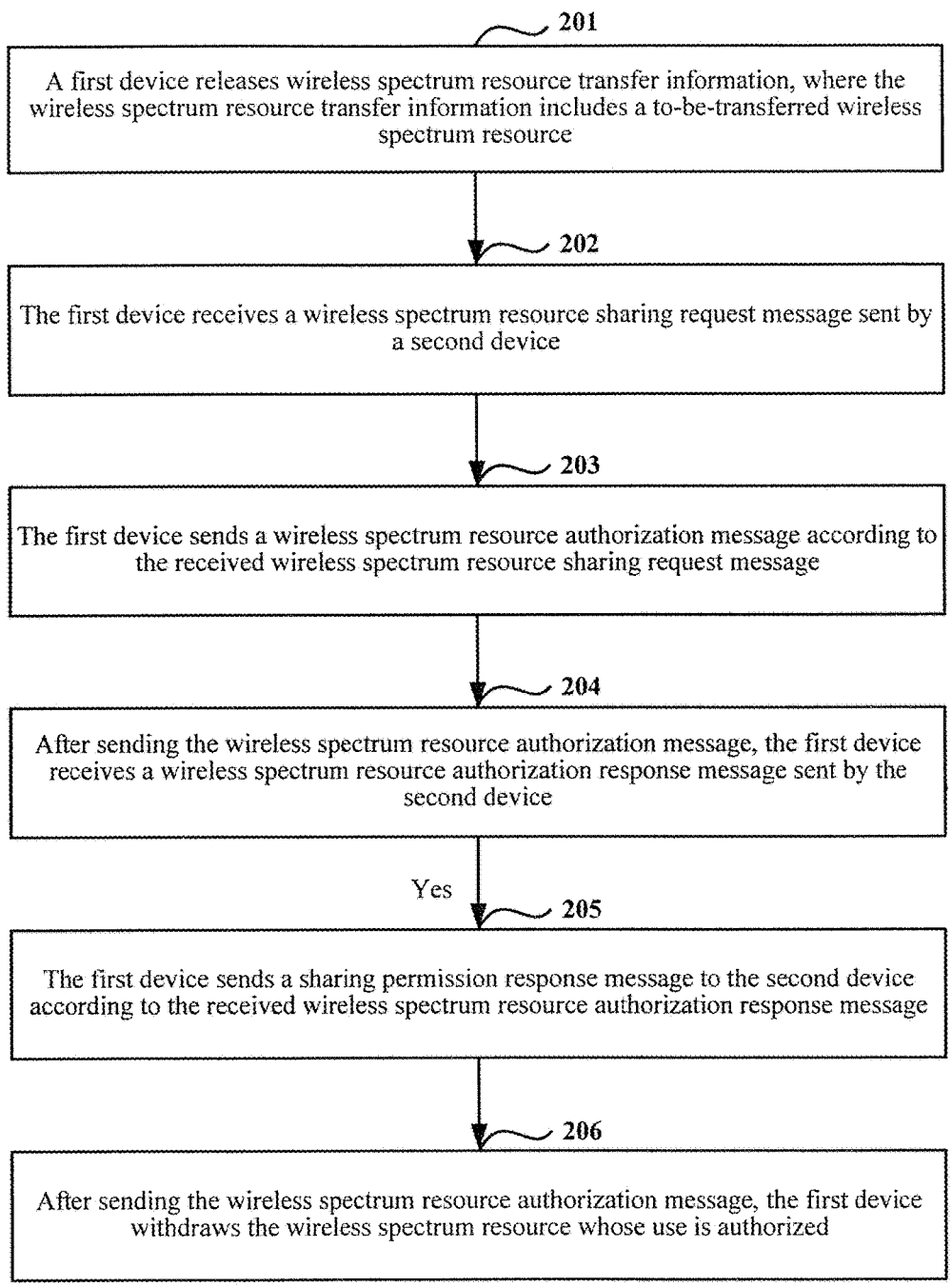
FIG. 2 is a flowchart of a wireless spectrum resource scheduling method according to Embodiment 3 of the present invention.

FIG. 2 is a flowchart of a wireless spectrum resource scheduling method according to Embodiment 3 of the present invention. Embodiment 3 of the present invention is an invention that belongs to a same inventive concept as those of Embodiment 1 and Embodiment 2 of the present invention. The method may be as follows:

Step 201: A first device releases wireless spectrum resource transfer information, where the wireless spectrum resource transfer information includes a to-be-transferred wireless spectrum resource.

In step 201, the first device broadcasts the wireless spectrum resource transfer information on a preconfigured broadcast resource.

The preconfigured broadcast resource includes at least a preconfigured channel resource, preconfigured broadcast timeslot information, and preconfigured code domain information.

Alternatively, the first device transmits the wireless spectrum resource transfer information by using a preconfigured wired interface between different devices.

It should be noted that the to-be-transferred wireless spectrum resource may be represented in the following manners: carrier information of the to-be-transferred wireless spectrum resource, such as bandwidth information, SFN (System Frame Number, system frame number) information, or time division duplex TDD configuration information of the wireless spectrum resource, carrier status information of the to-be-transferred wireless spectrum resource, such as service load information or interference information (which is, for example, indicated in a form of a percentage or a bitmap, where an indication granularity may be sub-bandwidth, PRB (Physical Resource Block, system resource block), or PRB group mode), information about a quantity of terminals that can be served, information about a distribution of service types of the terminals that can be served, and the like.

Step 202: The first device receives a wireless spectrum resource sharing request message sent by a second device.

The wireless spectrum resource sharing request message is sent when the second device determines, according to the to-be-transferred wireless spectrum resource included in the received wireless spectrum resource transfer information, that the second device needs to use the wireless spectrum resource of the base station device.

Optionally, the wireless spectrum resource sharing request message includes identifier information of the first device.

The identifier information of the first device is determined by the second device when the second device determines, according to the to-be-transferred wireless spectrum resource included in the received wireless spectrum resource transfer information, that the second device needs to use the to-be-transferred wireless spectrum resource.

Optionally, the wireless spectrum resource sharing request message further includes wireless spectrum resource requirement information.

It should be noted that the wireless spectrum resource requirement information included in the wireless spectrum resource sharing request message includes at least the following information: information about a quantity of terminal devices that need to be served, information about a distribution of service types of the terminal devices that need to be served, information about requested usage time, information about a requested usage mode (that is, a full bandwidth sharing mode, or a sub-bandwidth sharing mode, or a PRB or PRB group mode), TDM (Time Division Multiplexing, time division multiplexing) pattern information, information about a space division usage manner, information about a requested usage price, and the like.

Step 203: The first device sends a wireless spectrum resource authorization message according to the received wireless spectrum resource sharing request message.

The wireless spectrum resource authorization message includes authorization information used to respond to the wireless spectrum resource sharing request message, and the authorization information is information about the to-be-transferred wireless spectrum resource that the first device determines, according to the received wireless spectrum resource sharing request message, to authorize the second device to use.

In step 203, the sending, by the first device, a wireless spectrum resource authorization message according to the received wireless spectrum resource sharing request message includes:

when receiving multiple wireless spectrum resource sharing request messages sent by different second devices, determining, by the first device according to identifier information of a first device included in each of the received wireless spectrum resource sharing request messages, the wireless spectrum resource sharing request message including identifier information of a first device that is the same as the identifier information of the first device, and sending the wireless spectrum resource authorization message including the authorization information to the second device sending the determined wireless spectrum resource sharing request message;

or when receiving multiple wireless spectrum resource sharing request messages sent by different second devices, determining, by the first device according to wireless spectrum resource requirement information included in each of the received wireless spectrum resource sharing request messages, the wireless spectrum resource requirement information including wireless spectrum resource requirement information that matches the to-be-transferred wireless spectrum resource, and sending the wireless spectrum resource authorization message including the authorization information to the second device sending the determined wireless spectrum resource requirement information.

The authorization information includes at least one or more of indicator information, bandwidth information, time division duplex TDD configuration information, and load capacity information of the to-be-transferred wireless spectrum resource.

Step 204: After sending the wireless spectrum resource authorization message, the first device receives a wireless spectrum resource authorization response message sent by the second device.

The wireless spectrum resource authorization response message is used to inform the base station device sending the wireless spectrum resource authorization message that the authorized wireless spectrum resource is already accepted.

Step 205: The first device sends a sharing permission response message to the second device according to the received wireless spectrum resource authorization response message.

The sharing permission response message is used to respond to the wireless spectrum resource authorization response message sent by the determined second device and inform the second device that use of the authorized wireless spectrum resource is permitted.

Optionally, the first device sends a sharing permission response message to a demand side that determines to use the wireless spectrum resource, and/or sends a sharing refusal response message to a demand side that determines not to use the wireless spectrum resource.

The sharing permission response message includes bandwidth information of a carrier of the authorized wireless spectrum resource, time division duplex TDD configuration information, load capacity information of the authorized wireless spectrum resource, information about authorized usage duration, information about an authorized usage mode, and the like.

Besides, the sharing permission response message may further include carrier information of the usable wireless spectrum resource (that is, bandwidth information, SFN (System Frame Number, system frame number) information, time division duplex TDD configuration information, or the like of the wireless spectrum resource), carrier status information of the usable wireless spectrum resource (that is, service load information, interference information (which is, for example, indicated in a form of a percentage or a bitmap, where an indication granularity may be sub-bandwidth, PRB (Physical Resource Block, system resource block), or PRB group mode), information about a quantity of served terminals, information about a distribution of service types of the served terminals, information about an authorized period within which the wireless spectrum resource can be used, information about an authorized sharing mode of the wireless spectrum resource (for example, a full bandwidth sharing mode, a sub-bandwidth sharing mode, or a PRB or PRB group mode), TDM (Time Division Multiplexing, time division multiplexing) pattern information, information about a space division usage manner, information about a usage price, and the like.

Step 206: After sending the wireless spectrum resource authorization message, the first device withdraws the authorized wireless spectrum resource.

In step 206, a manner used by the first device to withdraw the authorized wireless spectrum resource in the following manners, but are not limited to the following manners:

A first manner:

The authorization information further includes information about authorized time for using the to-be-transferred wireless spectrum resource; and when the information that is included in the sharing permission response message and that is about the authorized time for using the to-be-transferred wireless spectrum resource is reached, the first device withdraws the authorized wireless spectrum resource.

A second manner:

After authorizing the second device to use the to-be-transferred wireless spectrum resource, the first device sends a wireless spectrum resource withdrawal message to the second device, where the wireless spectrum resource withdrawal message is used to instruct the second device to release the authorized wireless spectrum resource, or is used to inform the second device that all or some wireless spectrum resources whose use is authorized need to be withdrawn.

Optionally, the first device receives a withdrawal response message sent by the second device, and sends a withdrawal acknowledgement message to the second device.

Embodiment 4

A wireless spectrum resource scheduling method provided by Embodiment 4 of the present invention is an invention that belongs to a same inventive concept as that of Embodiment 3 of the present invention, and describes the solution in Embodiment 3 of the present invention in detail from the perspective of a second device. The method may be as follows:

The first step: A second device receives wireless spectrum resource transfer information released by a first device, where the wireless spectrum resource transfer information includes a to-be-transferred wireless spectrum resource.

The second step: The second device sends a wireless spectrum resource sharing request message to the first device.

The wireless spectrum resource sharing request message is used to respond to the wireless spectrum resource transfer information, and the wireless spectrum resource sharing request message is sent when the second device determines, according to the to-be-transferred wireless spectrum resource included in the received wireless spectrum resource transfer information, to use the wireless spectrum resource of the first device.

The wireless spectrum resource transfer information further includes identifier information of the first device.

When receiving multiple pieces of wireless spectrum resource transfer information sent by different first devices, the second device determines, according to a to-be-transferred wireless spectrum resource included in each of the received pieces of wireless spectrum resource transfer information, the to-be-transferred wireless spectrum resource matching the wireless spectrum resource that currently needs to be used; determines, according to the to-be-transferred wireless spectrum resource, the identifier information of the first device transferring the to-be-transferred wireless spectrum resource; and adds the determined identifier information of the first device to the wireless spectrum resource sharing request message, and sends the wireless spectrum resource sharing request message to the first device.

The third step: The second device receives a wireless spectrum resource authorization message sent by the first device.

The wireless spectrum resource authorization message includes authorization information used to respond to the wireless spectrum resource sharing request message, and the authorization information is information about the to-be-transferred wireless spectrum resource that the base station device determines, according to the received wireless spectrum resource sharing request message, to authorize the base station device to use.

The authorization information includes at least one or more of indicator information, bandwidth information, time division duplex TDD configuration information, and load capacity information of the to-be-transferred wireless spectrum resource.

The fourth step: The second device uses, according to the received wireless spectrum resource authorization message, the wireless spectrum resource that the first device authorizes the base station device to use.

When receiving multiple wireless spectrum resource authorization messages sent by different first devices, the second device chooses, according to authorization information included in each of the received wireless spectrum resource authorization messages, to use the authorized wireless spectrum resource.

The second device sends a wireless spectrum resource authorization response message to the first device that authorizes use of the selected wireless spectrum resource, where the wireless spectrum resource authorization response message is used to inform the first device, which authorizes use of the selected wireless spectrum resource, that the authorized wireless spectrum resource is already accepted; and receives a sharing permission response message sent by the first device, where the sharing permission response message is used to respond to the wireless spectrum resource authorization response message sent by the base station device and inform the second device that use of the authorized wireless spectrum resource is permitted.

The fifth step: When using the authorized wireless spectrum resource, the second device releases the used wireless spectrum resource.

The second device to release the used wireless spectrum resource when the second device uses the authorized wireless spectrum resource in the following manners, but are not limited to the following manners:

A first manner: The wireless spectrum resource authorization message further includes information about duration for which the wireless spectrum resource authorized to be used.

When using the authorized wireless spectrum resource, if determining that duration for which the authorized wireless spectrum resource is used already reaches the information that is included in the wireless spectrum resource authorization message and that is about the duration for which the wireless spectrum resource authorized to be used, the second device stops using the authorized wireless spectrum resource.

A second manner:

The second device receives a wireless spectrum resource withdrawal message sent by the first device of the currently used wireless spectrum resource, and stops, according to the received wireless spectrum resource withdrawal message, using the authorized wireless spectrum resource.

Specifically, the second device stops, according to information about an end time point carried in the received wireless spectrum resource withdrawal message, using the shared wireless spectrum resource when the information about the time point is satisfied or before the time point; or the second device stops, according to information about an end timer carried in the received wireless spectrum resource withdrawal message, using the shared wireless spectrum resource when the timer times out.

The method further includes:

after receiving the wireless spectrum resource withdrawal message sent by the first device that is authorized to use the wireless spectrum resource, sending, by the second device, a withdrawal response message, and releasing the authorized wireless spectrum resource.

Embodiment 5

Figure 3:
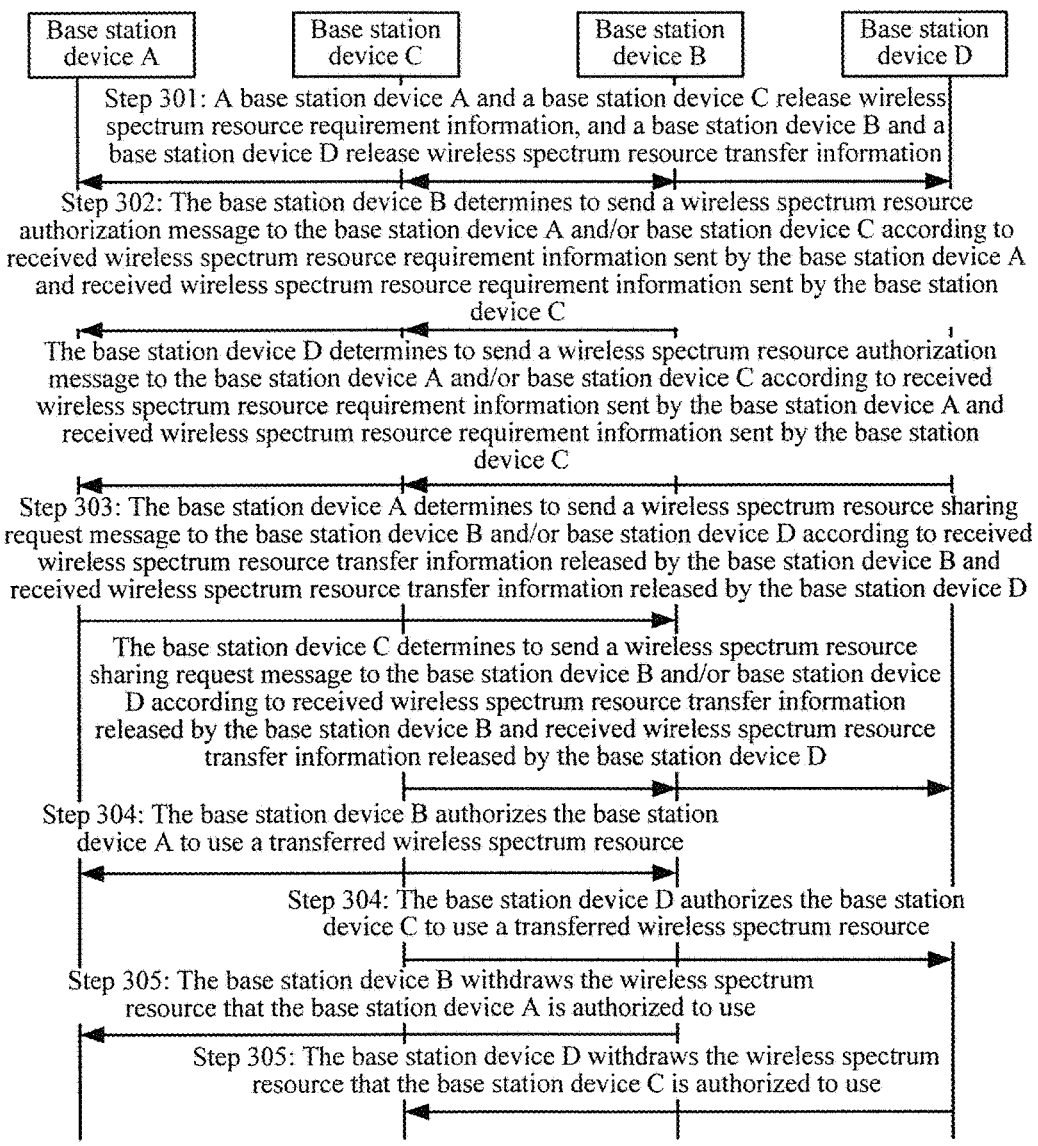
FIG. 3 is a flowchart of a wireless spectrum resource scheduling method according to Embodiment 5 of the present invention.

FIG. 3 is a flowchart of a wireless spectrum resource scheduling method according to Embodiment 5 of the present invention. Embodiment 5 of the present invention is an invention that belongs to a same inventive concept as those of Embodiment 1 to Embodiment 4 of the present invention, and is an actual application of Embodiment 1 to Embodiment 4 of the present invention from the perspective of information exchange between a device providing a wireless spectrum resource and a device requirement the wireless spectrum resource. The method may include the following:

It is assumed that an application scenario of Embodiment 5 of the present invention is: a base station device A and a base station device C requirement wireless spectrum resources, and a quantity of wireless spectrum resources required by the base station device A is greater than a quantity of wireless spectrum resources required by the base station device C; a base station device B and a base station device D provide wireless spectrum resources, and a quantity of wireless spectrum resources that can be provided by the base station device B is greater than a quantity of wireless spectrum resources that can be provided by the base station device D.

Step 301: The base station device A and the base station device C release wireless spectrum resource requirement information, and the base station device B and the base station device D release wireless spectrum resource transfer information.

In step 301, an information releasing manner used by the base station device A and the base station device C to release the wireless spectrum resource requirement information and the base station device B and the base station device D to release the wireless spectrum resource transfer information may be the manner described in Embodiment 1 to Embodiment 4 of the present invention, or may be another manner, which is not limited herein.

Wireless spectrum resource requirement information released by the base station device A includes a quantity of wireless spectrum resources currently required by the base station device A, and wireless spectrum resource requirement information released by the base station device C includes a quantity of wireless spectrum resources currently required by the base station device C.

Wireless spectrum resource transfer information released by the base station device B includes a to-be-transferred wireless spectrum resource of the base station device B, and wireless spectrum resource transfer information released by the base station device D includes a to-be-transferred wireless spectrum resource of the base station device D.

Step 302: The base station device B determines to send a wireless spectrum resource authorization message to the base station device A and/or base station device C according to the received wireless spectrum resource requirement information sent by the base station device A and the received wireless spectrum resource requirement information sent by the base station device C.

The base station device D determines to send a wireless spectrum resource authorization message to the base station device A and/or base station device C according to the received wireless spectrum resource requirement information sent by the base station device A and the received wireless spectrum resource requirement information sent by the base station device C.

It should be noted that a manner used by the base station device B and the base station device D to respectively send the wireless spectrum resource authorization messages to the base station device A and the base station device C may be implemented according to the manner described in Embodiment 1 to Embodiment 4 of the present invention.

Step 303: The base station device A determines to send a wireless spectrum resource sharing request message to the base station device B and/or base station device D according to the received wireless spectrum resource transfer information released by the base station device B and the received wireless spectrum resource transfer information released by the base station device D.

The base station device C determines to send a wireless spectrum resource sharing request message to the base station device B and/or base station device D according to the received wireless spectrum resource transfer information released by the base station device B and the received wireless spectrum resource transfer information released by the base station device D.

It should be noted that a manner used by the base station device A and the base station device C to respectively send the wireless spectrum resource sharing request messages to the base station device B and the base station device D may be implemented according to the manner described in Embodiment 1 to Embodiment 4 of the present invention.

It should be noted that step 302 and step 303 are not limited in terms of specific implementation time, and may be performed according to the progress of an actual procedure, and may not be implemented according to the sequence described in this embodiment of the present invention.

Step 304: The base station device B authorizes the base station device A to use a transferred wireless spectrum resource, and the base station device D authorizes the base station device C to use a transferred wireless spectrum resource.

In step 304, after information exchange between the base station device A, the base station device B, the base station device C, and the base station device D, the base station device A determines, according to the received wireless spectrum resource authorization messages, to accept the wireless spectrum resource transferred by the base station device B, to implement wireless spectrum resource scheduling between the base station device A and the base station device B; the base station device C determines, according to the received wireless spectrum resource authorization messages, the wireless spectrum resource transferred by the base station device D, to implement wireless spectrum resource scheduling between the base station device C and the base station device D;

and/or the base station device B determines, according to the received wireless spectrum resource sharing request messages, to authorize the base station device A to use the transferred wireless spectrum resource; the base station device D determines, according to the received wireless spectrum resource sharing request messages, to authorize the base station device C to use the transferred wireless spectrum resource.

Step 305: The base station device B withdraws the wireless spectrum resource that the base station device A is authorized to use, and the base station device D withdraws the wireless spectrum resource that the base station device C is authorized to use.

A manner used by the base station device B and the base station device D to withdraw the wireless spectrum resources may be implemented according to the manner in Embodiment 1 of the present invention to Embodiment 4 of the present invention, which is not described repeatedly herein.

For the method described in Embodiment 5 of the present invention, a specific implementation manner of each step may be implemented according to the manner described in Embodiment 1 of the present invention to Embodiment 4 of the present invention, which is not described repeatedly herein.

Embodiment 6

Figure 4:
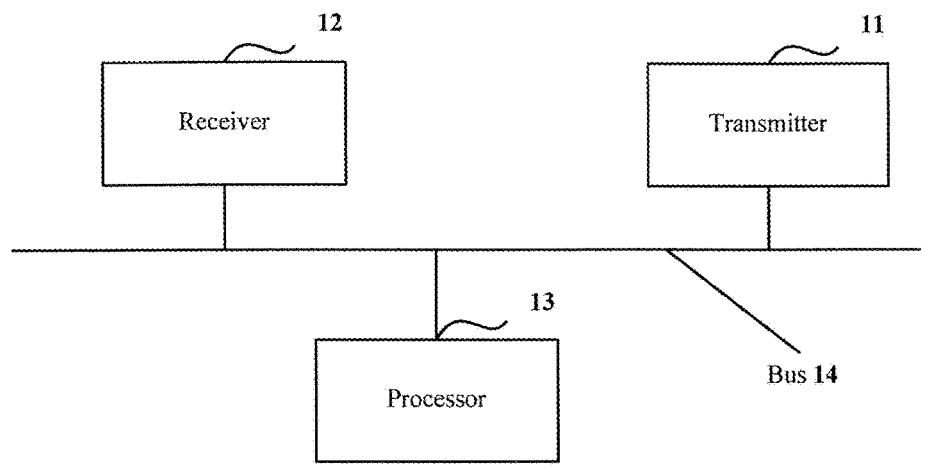
FIG. 4 is a schematic structural diagram of a base station device according to Embodiment 6 of the present invention.

FIG. 4 is a schematic structural diagram of a base station device according to Embodiment 6 of the present invention. Embodiment 6 of the present invention is an invention that belongs to a same inventive concept as those of Embodiment 1 of the present invention to Embodiment 4 of the present invention. The base station device includes: a transmitter 11, a receiver 12, and a processor 13, where the transmitter 11, the receiver 12, and the processor 13 are connected to each other by using a bus 14. Specifically, the transmitter 11 is configured to release wireless spectrum resource requirement information, where the wireless spectrum resource requirement information is used to indicate a currently required wireless spectrum resource;

the receiver 12 is configured to receive a wireless spectrum resource authorization message sent by a second device, where the wireless spectrum resource authorization message includes authorization information used to respond to the wireless spectrum resource requirement information, and the authorization information is information about a wireless spectrum resource that the second device determines, according to the wireless spectrum resource requirement info nation, to authorize the base station device to use; and the processor 13 is configured to use, according to the wireless spectrum resource authorization message received by the receiver, the wireless spectrum resource that the second device authorizes the base station device to use.

In another embodiment of the present invention, the wireless spectrum resource authorization message includes identifier information of the base station device, and the identifier information of the base station device is determined by the second device when the second device determines, according to the wireless spectrum resource requirement information, to authorize the base station device to use the wireless spectrum resource;

the receiver 12 is specifically configured to receive multiple wireless spectrum resource authorization messages sent by different second devices; and the processor 13 is specifically configured to determine, according to identifier information of a base station device included in each of the received wireless spectrum resource authorization messages, the wireless spectrum resource authorization message including identifier information of a base station device that is the same as the identifier information of the base station device, and use the authorized wireless spectrum resource that is included in the determined wireless spectrum resource authorization message.

In another embodiment of the present invention, the authorization information includes at least one or more of indicator information, bandwidth information, time division duplex TDD configuration information, and load capacity information of the wireless spectrum resource;

the receiver 12 is specifically configured to receive multiple wireless spectrum resource authorization messages sent by different second devices; and the processor 13 is specifically configured to select, according to authorization information included in each of the received wireless spectrum resource authorization messages, the wireless spectrum resource.

In another embodiment of the present invention, the transmitter 11 is further configured to send a wireless spectrum resource authorization response message before the authorized wireless spectrum resource is used, where the wireless spectrum resource authorization response message is used to inform the second device sending the wireless spectrum resource authorization message that the authorized wireless spectrum resource is already accepted.

In another embodiment of the present invention, the wireless spectrum resource authorization message further includes information about duration for which the wireless spectrum resource authorized to be used; and the processor 13 is further configured to: when using the authorized wireless spectrum resource, if determining that duration for which the authorized wireless spectrum resource is used already reaches the information that is included in the wireless spectrum resource authorization message and that is about the duration for which the wireless spectrum resource authorized to be used, stop using the authorized wireless spectrum resource.

In another embodiment of the present invention, the receiver 12 is further configured to a wireless spectrum resource withdrawal message sent by the second device providing the currently used wireless spectrum resource; and the processor 13 is further configured to stop, according to the received wireless spectrum resource withdrawal message, using the authorized wireless spectrum resource.

In another embodiment of the present invention, the transmitter 11 is specifically configured to transmit the wireless spectrum resource requirement information by using a preconfigured wired interface between different devices.

In another embodiment of the present invention, the transmitter 11 is specifically configured to broadcast the wireless spectrum resource requirement information on a preconfigured broadcast resource, where the preconfigured broadcast resource includes at least a preconfigured channel resource, preconfigured broadcast timeslot information, and preconfigured code domain information.

In another embodiment of the present invention, the receiver 12 is specifically configured to check in real time whether a wireless spectrum resource authorization message sent by a second device exists on the preconfigured broadcast resource, and when determining that the wireless spectrum resource authorization message sent by the second device exists on the preconfigured broadcast resource, receive the wireless spectrum resource authorization message.

It should be noted that the base station device in Embodiment 6 of the present invention has a capability of requirement a wireless spectrum resource provided by another device, and the base station device may be the first device described in Embodiment 1 or Embodiment 3 of the present invention, and may be a physical entity unit or a logical component integrated in a base station device, which is not specifically limited herein.

Embodiment 7

Embodiment 7 of the present invention is an invention that belongs to a same inventive concept as those of Embodiment 1 of the present invention to Embodiment 4 of the present invention. A base station device provided by Embodiment 7 of the present invention is at a peer end of the base station device in Embodiment 6 of the present invention. The base station device includes: a receiver, a processor, and a transmitter. Specifically, the receiver is configured to receive wireless spectrum resource requirement information released by a first device, where the wireless spectrum resource requirement information is used to indicate a currently required wireless spectrum resource;

the processor is configured to determine, according to the wireless spectrum resource requirement information, information about a wireless spectrum resource that the first device is authorized to use; and the transmitter is configured to send a wireless spectrum resource authorization message, where the wireless spectrum resource authorization message includes authorization information used to respond to the wireless spectrum resource requirement information, and the authorization information is the information that is determined by the processor and that is about the wireless spectrum resource that the first device is authorized to use.

In another embodiment of the present invention, the wireless spectrum resource requirement information further includes identifier information of the first device;

the receiver is specifically configured to receive multiple pieces of wireless spectrum resource requirement information sent by different first devices;

the processor is specifically configured to determine, according to each of the received pieces of wireless spectrum resource requirement information, the first device sending the wireless spectrum resource requirement information that matches the authorized wireless spectrum resource, and determine the identifier information of the first device; and the transmitter is specifically configured to add the determined identifier information of the first device and the authorization information to the wireless spectrum resource authorization message, and send the wireless spectrum resource authorization message, where the authorization information includes at least one or more of indicator information, bandwidth information, time division duplex TDD configuration information, and load capacity information of the wireless spectrum resource.

In another embodiment of the present invention, the receiver is further configured to receive a wireless spectrum resource authorization response message sent by the first device, where the wireless spectrum resource authorization response message is used to inform the base station device sending the wireless spectrum resource authorization message that the authorized wireless spectrum resource is already accepted; and the processor is further configured to determine, according to the wireless spectrum resource authorization response message, that the wireless spectrum resource that the first device is authorized to use is already accepted by the first device, and send a usage acknowledgement message to the first device.

In another embodiment of the present invention, the wireless spectrum resource authorization message further includes information about duration for which the wireless spectrum resource authorized to be used; and the processor is further configured to: when the information that is included in the wireless spectrum resource authorization message and that is about the duration for which the wireless spectrum resource authorized to be used is reached, withdraw the wireless spectrum resource that the first device is authorized to use.

In another embodiment of the present invention, the transmitter is further configured to send a wireless spectrum resource withdrawal message, where the wireless spectrum resource withdrawal message is used to inform the first device that all or some wireless spectrum resources whose use is authorized need to be withdrawn.

In another embodiment of the present invention, the receiver is further configured to: when receiving the wireless spectrum resource requirement information sent by the first device, determine a broadcast resource bearing the sent wireless spectrum resource requirement information; and the transmitter is specifically configured to send the wireless spectrum resource authorization message to the first device in the determined broadcast resource as a bearer.

It should be noted that the base station device in Embodiment 7 of the present invention has a capability of providing a wireless spectrum resource for another device, and the base station device may be the second device described in Embodiment 2 or Embodiment 3 of the present invention, and may be a physical entity unit or a logical component integrated in a base station device, which is not specifically limited herein.

Embodiment 8

Figure 5:
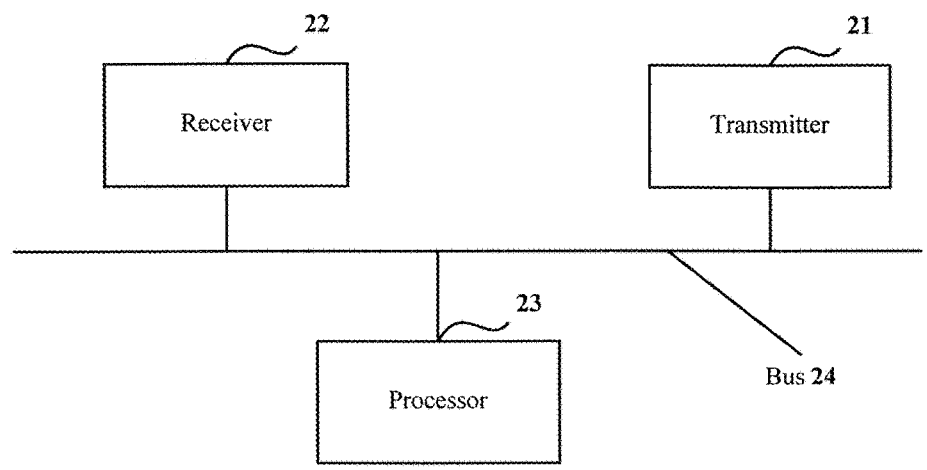
FIG. 5 is a schematic structural diagram of a base station device according to Embodiment 8 of the present invention.

FIG. 5 is a schematic structural diagram of a base station device according to Embodiment 8 of the present invention. Embodiment 8 of the present invention is an invention that belongs to a same inventive concept as those of Embodiment 1 of the present invention to Embodiment 4 of the present invention. The base station device includes: a transmitter 21, a receiver 22, and a processor 23, where the transmitter 21, the receiver 22, and the processor 23 are connected to each other by using a bus 24. Specifically, the transmitter 21 is configured to release wireless spectrum resource transfer information, where the wireless spectrum resource transfer information includes a to-be-transferred wireless spectrum resource;

the receiver 22 is configured to receive a wireless spectrum resource sharing request message sent by a second device, where the wireless spectrum resource sharing request message is sent when the second device determines, according to the to-be-transferred wireless spectrum resource included in the received wireless spectrum resource transfer information, that the second device needs to use the wireless spectrum resource of the base station device; and the processor 23 is configured to send a wireless spectrum resource authorization message according to the received wireless spectrum resource sharing request message, where the wireless spectrum resource authorization message includes authorization information used to respond to the wireless spectrum resource sharing request message, and the authorization information is information about the to-be-transferred wireless spectrum resource that the base station device determines, according to the received wireless spectrum resource sharing request message, to authorize the second device to use.

In another embodiment of the present invention, the wireless spectrum resource sharing request message includes identifier information of the base station device, where the identifier information of the base station device is determined by the second device when the second device determines, according to the to-be-transferred wireless spectrum resource included in the received wireless spectrum resource transfer information, that the second device needs to use the to-be-transferred wireless spectrum resource;

the receiver 22 is specifically configured to receive multiple wireless spectrum resource sharing request messages sent by different second devices; and the processor 23 is specifically configured to determine, according to identifier information of a base station device included in each of the received wireless spectrum resource sharing request messages, the wireless spectrum resource sharing request message including identifier information of a base station device that is the same as the identifier information of the base station device, and send the wireless spectrum resource authorization message including the authorization information to the second device sending the determined wireless spectrum resource sharing request message, where the authorization information includes at least one or more of indicator information, bandwidth information, time division duplex TDD configuration information, and load capacity information of the to-be-transferred wireless spectrum resource.

In another embodiment of the present invention, the wireless spectrum resource sharing request message further includes wireless spectrum resource requirement information;

the receiver 22 is specifically configured to receive multiple wireless spectrum resource sharing request messages sent by different second devices; and the processor 23 is specifically configured to determine, according to wireless spectrum resource requirement information included in each of the received wireless spectrum resource sharing request messages, the wireless spectrum resource requirement information including wireless spectrum resource requirement information that matches the to-be-transferred wireless spectrum resource, and send the wireless spectrum resource authorization message including the authorization information to the second device sending the determined wireless spectrum resource requirement information, where the authorization information includes at least one or more of indicator information, bandwidth information, time division duplex TDD configuration information, and load capacity information of the to-be-transferred wireless spectrum resource.

In another embodiment of the present invention, the receiver 22 is further configured to receive a wireless spectrum resource authorization response message sent by the second device, where the wireless spectrum resource authorization response message is used to inform the base station device sending the wireless spectrum resource authorization message that the authorized wireless spectrum resource is already accepted; and the transmitter 21 is further configured to send a sharing permission response message to the second device according to the wireless spectrum resource authorization response message received by the receiver, where the sharing permission response message is used to respond to the wireless spectrum resource authorization response message sent by the determined second device and inform the second device that use of the authorized wireless spectrum resource is permitted.

In another embodiment of the present invention, the authorization information further includes information about authorized time for using the to-be-transferred wireless spectrum resource; and the processor 23 is further configured to: when the information that is included in the sharing permission response message and that is about the authorized time for using the to-be-transferred wireless spectrum resource is reached, withdraw the authorized wireless spectrum resource.

In another embodiment of the present invention, the transmitter 21 is further configured to: after the second device is authorized to use the to-be-transferred wireless spectrum resource, send a wireless spectrum resource withdrawal message to the second device, where the wireless spectrum resource withdrawal message is used to instruct the second device to release the authorized wireless spectrum resource.

In another embodiment of the present invention, the transmitter 21 is specifically configured to broadcast the wireless spectrum resource transfer information on a preconfigured broadcast resource, where the preconfigured broadcast resource includes at least a preconfigured channel resource, preconfigured broadcast timeslot information, and preconfigured code domain information;

or transmit the wireless spectrum resource transfer information by using a preconfigured wired interface between different devices.

It should be noted that the base station device in Embodiment 8 of the present invention has a capability of providing a wireless spectrum resource for another device, and the base station device may be the second device described in Embodiment 2 or Embodiment 3 of the present invention, and may be a physical entity unit or a logical component integrated in a base station device, which is not specifically limited herein.

It should be noted that the function described in Embodiment 8 of the present invention and the function described in Embodiment 7 of the present invention may appear in a same base station device, and are used to provide a wireless spectrum resource for another base station device. A difference lies in different manners for initiating the providing of the wireless spectrum resource, where the function described in Embodiment 7 of the present invention belongs to passive providing, while the function described in Embodiment 8 of the present invention belongs to active providing.

Embodiment 9

Embodiment 9 of the present invention provides a base station device. Embodiment 9 of the present invention is an invention that belongs to a same inventive concept as those of Embodiment 1 of the present invention to Embodiment 4 of the present invention. The base station device includes: a receiver, a transmitter, and a processor, where the receiver, the transmitter, and the processor are connected to each other by using a bus. Specifically, the receiver is configured to receive wireless spectrum resource transfer information released by a first device, where the wireless spectrum resource transfer information includes a to-be-transferred wireless spectrum resource;

the transmitter is configured to send a wireless spectrum resource sharing request message to the first device, where the wireless spectrum resource sharing request message is used to respond to the wireless spectrum resource transfer information, and the wireless spectrum resource sharing request message is sent when the base station device determines, according to the to-be-transferred wireless spectrum resource included in the received wireless spectrum resource transfer information, to use the wireless spectrum resource of the first device, where the receiver is further configured to receive a wireless spectrum resource authorization message sent by the first device, where the wireless spectrum resource authorization message includes authorization information used to respond to the wireless spectrum resource sharing request message, and the authorization information is information about the to-be-transferred wireless spectrum resource that the base station device determines, according to the received wireless spectrum resource sharing request message, to authorize the base station device to use; and the processor is configured to use, according to the wireless spectrum resource authorization message received by the receiver, the wireless spectrum resource that the first device authorizes the base station device to use.

In another embodiment of the present invention, the wireless spectrum resource transfer information further includes identifier information of the first device;

the receiver is specifically configured to receive multiple pieces of wireless spectrum resource transfer information sent by different first devices;

the processor is specifically configured to determine, according to a to-be-transferred wireless spectrum resource included in each of the received pieces of wireless spectrum resource transfer information, the to-be-transferred wireless spectrum resource matching the wireless spectrum resource that currently needs to be used, and determine, according to the to-be-transferred wireless spectrum resource, the identifier information of the first device transferring the to-be-transferred wireless spectrum resource; and the transmitter is specifically configured to add the determined identifier information of the first device to the wireless spectrum resource sharing request message, and send the wireless spectrum resource sharing request message to the first device.

In another embodiment of the present invention, the authorization information includes at least one or more of indicator information, bandwidth information, time division duplex TDD configuration information, and load capacity information of the to-be-transferred wireless spectrum resource;

the receiver is further configured to receive multiple wireless spectrum resource authorization messages sent by different first devices; and the processor is further configured to choose, according to authorization information included in each of the received wireless spectrum resource authorization messages, to use the authorized wireless spectrum resource.

In another embodiment of the present invention, the transmitter is further configured to send a wireless spectrum resource authorization response message to the first device that authorizes use of the selected wireless spectrum resource, where the wireless spectrum resource authorization response message is used to inform the first device, which authorizes use of the selected wireless spectrum resource, that the authorized wireless spectrum resource is already accepted; and the receiver is further configured to receive a sharing permission response message sent by the first device, where the sharing permission response message is used to respond to the wireless spectrum resource authorization response message sent by the base station device and inform the base station device that use of the authorized wireless spectrum resource is permitted.

It should be noted that the base station device in Embodiment 9 of the present invention has a capability of requirement a wireless spectrum resource provided by another device, and the base station device may be the first device described in Embodiment 1 or Embodiment 3 of the present invention, and may be a physical entity unit or a logical component integrated in a base station device, which is not specifically limited herein in Embodiment 9 of the present invention.

It should be noted that the function described in Embodiment 9 of the present invention and the function described in Embodiment 6 of the present invention may appear in a same base station device, and another base station device requirements to provide a wireless spectrum resource for the base station device. A difference lies in different manners for acquiring the wireless spectrum resource of the another base station device, where the function described in Embodiment 9 of the present invention belongs to passive acceptance, while the function described in Embodiment 6 of the present invention belongs to active acquisition.

It should be noted that the base station device described in Embodiment 6 of the present invention to Embodiment 9 of the present invention may be a mechanism or a physical entity having a resource management and allocation function.

Embodiment 10

Figure 6:
FIG. 6 is a schematic structural diagram of a wireless spectrum resource scheduling system according to Embodiment 10 of the present invention.

FIG. 6 is a schematic structural diagram of a wireless spectrum resource scheduling system according to Embodiment 10 of the present invention. The wireless spectrum resource scheduling system includes a base station device 31 providing a wireless spectrum resource and a base station device 32 requirement the wireless spectrum resource.

The base station device 31 providing the wireless spectrum resource may have the function of the base station device described in Embodiment 7 and Embodiment 8 of the present invention, and can implement wireless spectrum resource scheduling according to the manner in Embodiment 2 and Embodiment 3 of the present invention, for example, the base station device B and the base station device D in Embodiment 5; the base station device 32 requirement the wireless spectrum resource may have the function of the base station device described in Embodiment 6 and Embodiment 9 of the present invention, and can implement wireless spectrum resource scheduling according to the manner in Embodiment 1 and Embodiment 4 of the present invention, for example, the base station device A and the base station device C in Embodiment 5. Detailed content is not described herein.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exists, and only B exists. In addition, the character "I" in this specification generally indicates an "or" relationship between the associated objects. In the foregoing embodiments, the description of each embodiment has respective focuses. For a part that is not described in detail in an embodiment, reference may be made to related descriptions in other embodiments.

It should be noted that in this specification, relational teens such as first and second are only used to distinguish one entity or operation from another, and do not necessarily require or imply that any actual relationship or sequence exists between these entities or operations. Moreover, the terms "include", "include", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A base station device, comprising:
a transmitter, configured to transmit wireless spectrum resource requirement information that indicates a required wireless spectrum resource;
a receiver, configured to receive, from a second device, a wireless spectrum resource authorization message in response to the wireless spectrum resource requirement information, wherein the wireless spectrum resource authorization message indicates a wireless spectrum resource authorized to be used by the base station device; and
a processor, configured to determine, according to the wireless spectrum resource authorization message received by the receiver, an authorized wireless spectrum resource to be used;
wherein, while the authorized wireless spectrum resource is being currently used, the receiver is further configured to receive a wireless spectrum resource withdrawal message from the second device, the second device providing the authorized wireless spectrum resource; and
wherein the processor is further configured to stop, in response to receiving the wireless spectrum resource withdrawal message, using the authorized wireless spectrum resource.

2. The base station device according to claim 1, wherein:
the receiver is further configured to receive multiple wireless spectrum resource authorization messages from different second devices, wherein each received wireless spectrum resource authorization message comprises identifier information of a base station; and
the processor is further configured to select the wireless spectrum resource authorization message from the multiple received wireless spectrum resource authorization messages according to the identifier information of the base station.

3. The base station device according to claim 1, wherein:
the receiver is further configured to receive multiple wireless spectrum resource authorization messages from different devices, wherein each received wireless spectrum resource authorization message comprises at least one of bandwidth information, time division duplex (TDD) configuration information, and load capacity information of a wireless spectrum resource; and
the processor is further configured to select, according to authorization information comprised in each of the received wireless spectrum resource authorization messages, the wireless spectrum resource authorization message from the multiple received wireless spectrum resource authorization messages.

4. The base station device according to claim 1, wherein the transmitter is further configured to:
send a wireless spectrum resource authorization response message before the authorized wireless spectrum resource is used, wherein the wireless spectrum resource authorization response message is for informing the second device sending the wireless spectrum resource authorization message that the authorized wireless spectrum resource is already accepted.

5. The base station device according to claim 1, wherein:
the wireless spectrum resource authorization message further comprises information about a duration for which the authorized wireless spectrum resource is authorized to be used; and
the processor is further configured to use the authorized wireless spectrum resource for the duration indicated by the information comprised in the wireless spectrum resource authorization message.

6. The base station device according to claim 1, wherein the transmitter is further configured to:
transmit the wireless spectrum resource requirement information via a preconfigured wired interface between the base station device and the second device.

7. The base station device according to claim 1, wherein the transmitter is further configured to:
broadcast the wireless spectrum resource requirement information on a preconfigured broadcast resource comprising at least one of a preconfigured channel resource, preconfigured broadcast timeslot information, and preconfigured code domain information.

8. The base station device according to claim 7, wherein the receiver is further configured to:
monitor in real time whether a wireless spectrum resource authorization message exists on the preconfigured broadcast resource.

9. The base station device according to claim 1, wherein the wireless spectrum resource requirement information comprises at least one of the following:
information about a quantity of required wireless spectrum resources, information about a quantity of terminal devices that need to be served, information about a distribution of service types of the terminal devices that need to be served.

10. A wireless spectrum resource sharing method, comprising:
transmitting, by a base station, wireless spectrum resource requirement information that indicates a required wireless spectrum resource;
receiving, by the base station from a second device, a wireless spectrum resource authorization message in response to the wireless spectrum resource requirement information, wherein the wireless spectrum resource authorization message indicates a wireless spectrum resource authorized to be used by the base station;
determining, by the base station, an authorized wireless spectrum resource to be used according to the wireless spectrum resource authorization message;
receiving, by the base station while the authorized wireless spectrum resource is being currently used, a wireless spectrum resource withdrawal message from the second device, the second device providing the authorized wireless spectrum resource; and
stopping, by the base station, using the authorized wireless spectrum resource in response to receiving the wireless spectrum resource withdrawal message.

11. The method according to claim 10, wherein:
receiving, by the base station, a wireless spectrum resource authorization message in response to wireless spectrum resource requirement information from the second device comprises:
receiving, by the base station, multiple wireless spectrum resource authorization messages from different second devices, wherein each received wireless spectrum resource authorization message comprises identifier information of a base station; and
determining, by the base station, an authorized wireless spectrum resource to be used according to the wireless spectrum resource authorization message comprises:
selecting, by the base station, the wireless spectrum resource authorization message from the multiple received wireless spectrum resource authorization messages according to the identifier information of the base station.

12. The method according to claim 10, wherein:
receiving, by the base station, a wireless spectrum resource authorization message in response to wireless spectrum resource requirement information from the second device comprises:
receiving, by the base station, multiple wireless spectrum resource authorization messages sent by different second devices, wherein each received wireless spectrum resource authorization message comprises at least one of bandwidth information, time division duplex (TDD) configuration information, and load capacity information of a wireless spectrum resource; and
determining, by the base station, an authorized wireless spectrum resource to be used according to the wireless spectrum resource authorization message comprises:
selecting, by the base station according to authorization information comprised in each of the received wireless spectrum resource authorization messages, the wireless spectrum resource authorization message from the multiple received wireless spectrum resource authorization messages.

13. The method according to claim 10, further comprising:
transmitting, by the base station, a wireless spectrum resource authorization response message before the authorized wireless spectrum resource is used, wherein the wireless spectrum resource authorization response message is for informing the second device sending the wireless spectrum resource authorization message that the authorized wireless spectrum resource is already accepted.

14. The method according to claim 10, wherein the wireless spectrum resource authorization message further comprises information about a duration for which the authorized wireless spectrum resource is authorized to be used, and the method further comprises:
using, by the base station, the authorized wireless spectrum resource for the duration indicated by the information comprised in the wireless spectrum resource authorization message.

15. The method according to claim 10, wherein transmitting, by a base station, wireless spectrum resource requirement information comprises:
broadcasting, by the base station, the wireless spectrum resource requirement information on a preconfigured broadcast resource comprising at least one of a preconfigured channel resource, preconfigured broadcast timeslot information, and preconfigured code domain information.

16. The method according to claim 15, further comprising:
monitoring, by the base station, in real time whether a wireless spectrum resource authorization message exists on the preconfigured broadcast resource.

17. The method according to claim 10, wherein the wireless spectrum resource requirement information comprises at least one of the following:
information about a quantity of required wireless spectrum resources, information about a quantity of terminal devices that need to be served, information about a distribution of service types of the terminal devices that need to be served.

18. The method according to claim 10, wherein the second device is another base station.

19. A non-transitory computer-readable medium containing instructions that when executed cause a processor to control a base station to:
transmit wireless spectrum resource requirement information that indicates a required wireless spectrum resource;
receive, from a second device, a wireless spectrum resource authorization message in response to the wireless spectrum resource requirement information, wherein the wireless spectrum resource authorization message indicates a wireless spectrum resource authorized to be used by the base station;
determine an authorized wireless spectrum resource to be used according to the wireless spectrum resource authorization message;
receive, while the authorized wireless spectrum resource is being currently used, a wireless spectrum resource withdrawal message from the second device, the second device providing the authorized wireless spectrum resource; and
stop using the authorized wireless spectrum resource in response to receiving the wireless spectrum resource withdrawal message.

* * * * *